(12) United States Patent
Yates et al.

(10) Patent No.: US 10,881,967 B2
(45) Date of Patent: Jan. 5, 2021

(54) METHOD, APPARATUS, AND COMPUTER-READABLE MEDIUM FOR EXECUTING A MULTI-PLAYER CARD GAME ON A SINGLE DISPLAY

(71) Applicants: Roy Yates, Freeport, TX (US); Calvin Day, Lake Jackson, TX (US)

(72) Inventors: Roy Yates, Freeport, TX (US); Calvin Day, Lake Jackson, TX (US)

( * ) Notice: Subject to any disclaimer, the term of this patent is extended or adjusted under 35 U.S.C. 154(b) by 408 days.

(21) Appl. No.: 15/346,311

(22) Filed: Nov. 8, 2016

(65) Prior Publication Data

US 2018/0126283 A1    May 10, 2018

(51) Int. Cl.
| | | |
|---|---|---|
| *G07F 17/32* | (2006.01) | |
| *A63F 13/822* | (2014.01) | |
| *A63F 13/25* | (2014.01) | |
| *A63F 13/2145* | (2014.01) | |
| *A63F 13/24* | (2014.01) | |
| *A63F 13/90* | (2014.01) | |

(52) U.S. Cl.
CPC ........ *A63F 13/822* (2014.09); *A63F 13/2145* (2014.09); *A63F 13/24* (2014.09); *A63F 13/25* (2014.09); *A63F 13/90* (2014.09); *G07F 17/32* (2013.01); *G07F 17/322* (2013.01)

(58) Field of Classification Search
CPC .................................................. G07F 17/322
See application file for complete search history.

(56) References Cited

U.S. PATENT DOCUMENTS

| | | | | |
|---|---|---|---|---|
| 5,669,817 A | * | 9/1997 | Tarantino | A63F 3/00157 273/309 |
| 7,556,561 B2 | * | 7/2009 | White | G07F 17/32 273/149 P |
| 7,758,425 B2 | * | 7/2010 | Poh | A63F 13/00 463/42 |
| 7,794,324 B2 | * | 9/2010 | White | G07F 17/32 273/274 |
| 8,696,428 B1 | * | 4/2014 | Post | G07F 17/3211 273/138.1 |
| 8,715,061 B1 | * | 5/2014 | Post | G07F 17/322 463/20 |
| 2005/0040601 A1 | * | 2/2005 | Yoseloff | A63F 3/00157 273/292 |
| 2005/0049049 A1 | * | 3/2005 | Griswold | G07F 17/3206 463/46 |

(Continued)

*Primary Examiner* — Jay Trent Liddle
(74) *Attorney, Agent, or Firm* — Amardeep S. Grewal; Robert R. Riddle; Reed Smith LLP

(57) ABSTRACT

An apparatus, computer-readable medium, and computer-implemented method for executing a multi-player card game on a single display, including generating playing cards corresponding to each player in a plurality of players, transmitting a plurality of images to a plurality of regions of a single display, each region corresponding to a player in the plurality of players, each region being located at a position on the single display which is closer to a physical location reserved for the corresponding player than to any other physical location reserved for any other player, and the plurality of images including a representation of the playing cards corresponding to each player, receiving one or more inputs from one or more players in the plurality of players, and transmitting one or more new images to the single display in response to the one or more inputs.

16 Claims, 24 Drawing Sheets

(56) References Cited

U.S. PATENT DOCUMENTS

| | | | |
|---|---|---|---|
| 2005/0073102 A1* | 4/2005 | Yoseloff | G07F 17/32 273/292 |
| 2006/0058092 A1* | 3/2006 | Crawford, III | G07F 17/3276 463/13 |
| 2006/0068899 A1* | 3/2006 | White | G07F 17/32 463/25 |
| 2006/0189384 A1* | 8/2006 | Crawford, III | A63F 13/10 463/31 |
| 2006/0205466 A1* | 9/2006 | White | A63F 13/10 463/11 |
| 2006/0205467 A1* | 9/2006 | White | A63F 13/10 463/11 |
| 2007/0298854 A1* | 12/2007 | Yoseloff | G07F 17/32 463/11 |
| 2008/0207295 A1* | 8/2008 | Yoseloff | G07F 17/32 463/13 |
| 2008/0300034 A1* | 12/2008 | Savage | G07F 17/3202 463/11 |
| 2009/0131134 A1* | 5/2009 | Baerlocher | G07F 17/3211 463/13 |
| 2009/0143141 A1* | 6/2009 | Wells | G07F 17/32 463/37 |
| 2009/0325686 A1* | 12/2009 | Davis | G07F 17/32 463/25 |
| 2011/0065513 A1* | 3/2011 | Nordahl | G07F 17/322 463/46 |
| 2013/0165215 A1* | 6/2013 | Arezina | G07F 17/3206 463/25 |
| 2014/0038680 A1* | 2/2014 | Pececnik | G07F 17/3293 463/13 |
| 2014/0179392 A1* | 6/2014 | Post | G07F 17/322 463/16 |
| 2016/0067592 A1* | 3/2016 | Patterson | G07F 17/34 273/274 |
| 2016/0196722 A1* | 7/2016 | Davis | G07F 17/32 463/25 |
| 2017/0061732 A1* | 3/2017 | Baerlocher | G07F 17/3244 |

* cited by examiner

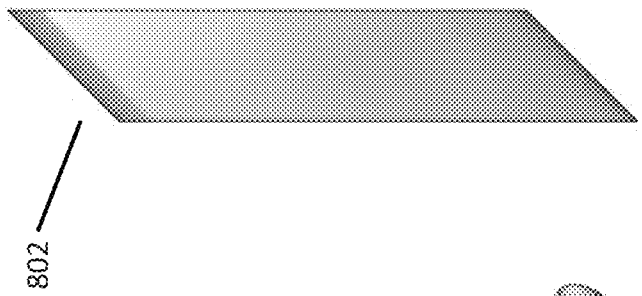
Fig. 8F
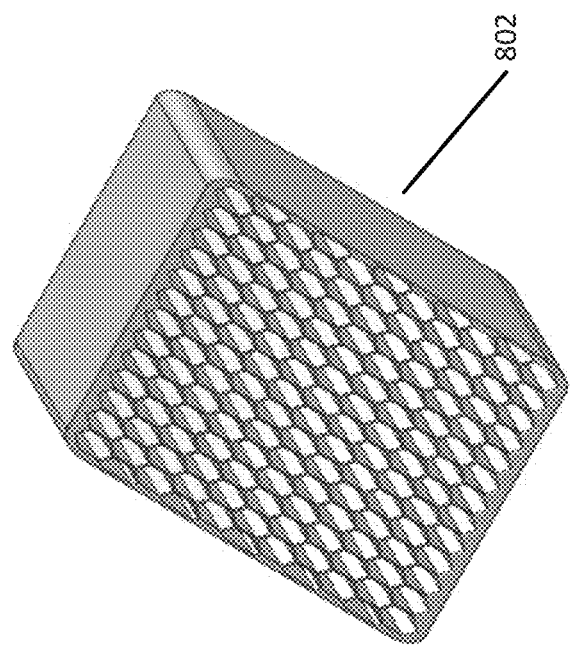
Fig. 8E
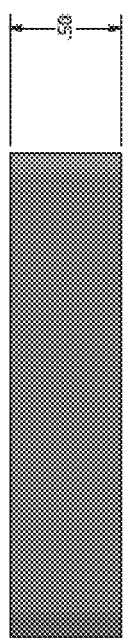
Fig. 8C
Fig. 8D

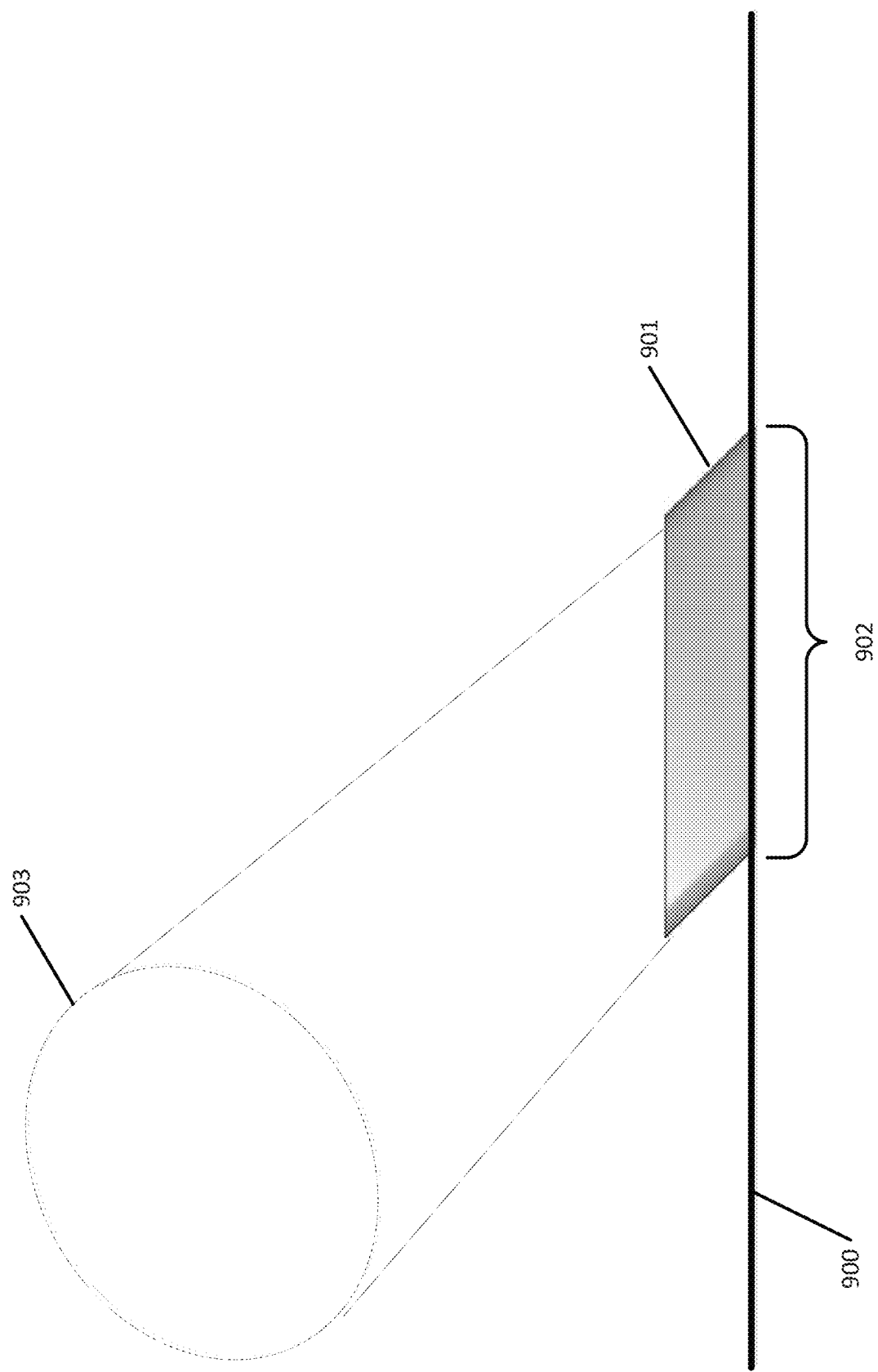

Fig. 14

METHOD, APPARATUS, AND COMPUTER-READABLE MEDIUM FOR EXECUTING A MULTI-PLAYER CARD GAME ON A SINGLE DISPLAY

BACKGROUND

The popularity of multi-player card games in casinos has risen significantly in the past fifteen years. For example, the number of total entrants into the annual World Series of Poker® has risen from 512 entrants in 2000 to 6,420 entrants in 2015.

As the number of poker players (and other card game players) in casinos increases, casino operators must employ additional dealers and other casino staff in order to accommodate the influx of new players and the rising popularity of multi-player card games.

One solution has been to utilize electronic tables to automate the process of playing a multi-player card game. For example, the "PokerPro" series of electronic poker tables include a table having a central display which displays community cards and a separate player-facing display for each player which displays the player's cards and chips. Electronic poker tables having multiple screens, such as the PokerPro table, do not require a human dealer, cards or chips. However, there are a number of drawbacks to such tables.

Despite several attempts to introduce multi-screen electronic tables into gaming environments, there has been a widespread lack of acceptance of these tables due to the profoundly different user experience of players at the table. Unlike a regular poker game, where players are gathered around a single flat area and interact directly with other players, players at multi-screen tables are instead fixated on their own screens, which often protrude from the table in the direction of each player. Additionally, as each player's own cards are exposed on their own screen, they are put in the position of having to shield other players from their screen to avoid exposure of their cards.

From a cost perspective, multi-screen electronic tables are expensive to produce. For example, a standard multi-screen poker table requires eleven different electronic displays, as well as additional hardware and software to synchronize the eleven electronic displays.

Additionally, the quantity of functioning hardware components required for multi-screen electronic tables greatly increases the risk of hardware failure. For example, if a hardware component linking the electronic screens fails or one or more of the electronic screens fails, then the entire table can be rendered non-functional.

Accordingly, improvements are needed in multi-player electronic card games which preserve a traditional user experience, reduce costs, and limit the risk of hardware failure.

BRIEF DESCRIPTION OF THE DRAWINGS

FIGS. 8A-8F illustrate various view of a concealing element according to an exemplary embodiment.

FIG. 9 illustrates a concealing element disposed on the surface of the single display according to an exemplary embodiment.

FIG. 14 illustrates a configuration interface that can be displayed on the single display according to an exemplary embodiment.

DETAILED DESCRIPTION

While methods, apparatuses, and computer-readable media are described herein by way of examples and embodiments, those skilled in the art recognize that methods, apparatuses, and computer-readable media for executing a multi-player card game on a single display are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered methods, apparatuses, and computer-readable media for executing a multi-player card game on a single display. The present system reduces the cost of producing multi-player electronic card games substantially, reduces the hardware points of failure, and allows for a more traditional looking table and user experience.

Figure 1:
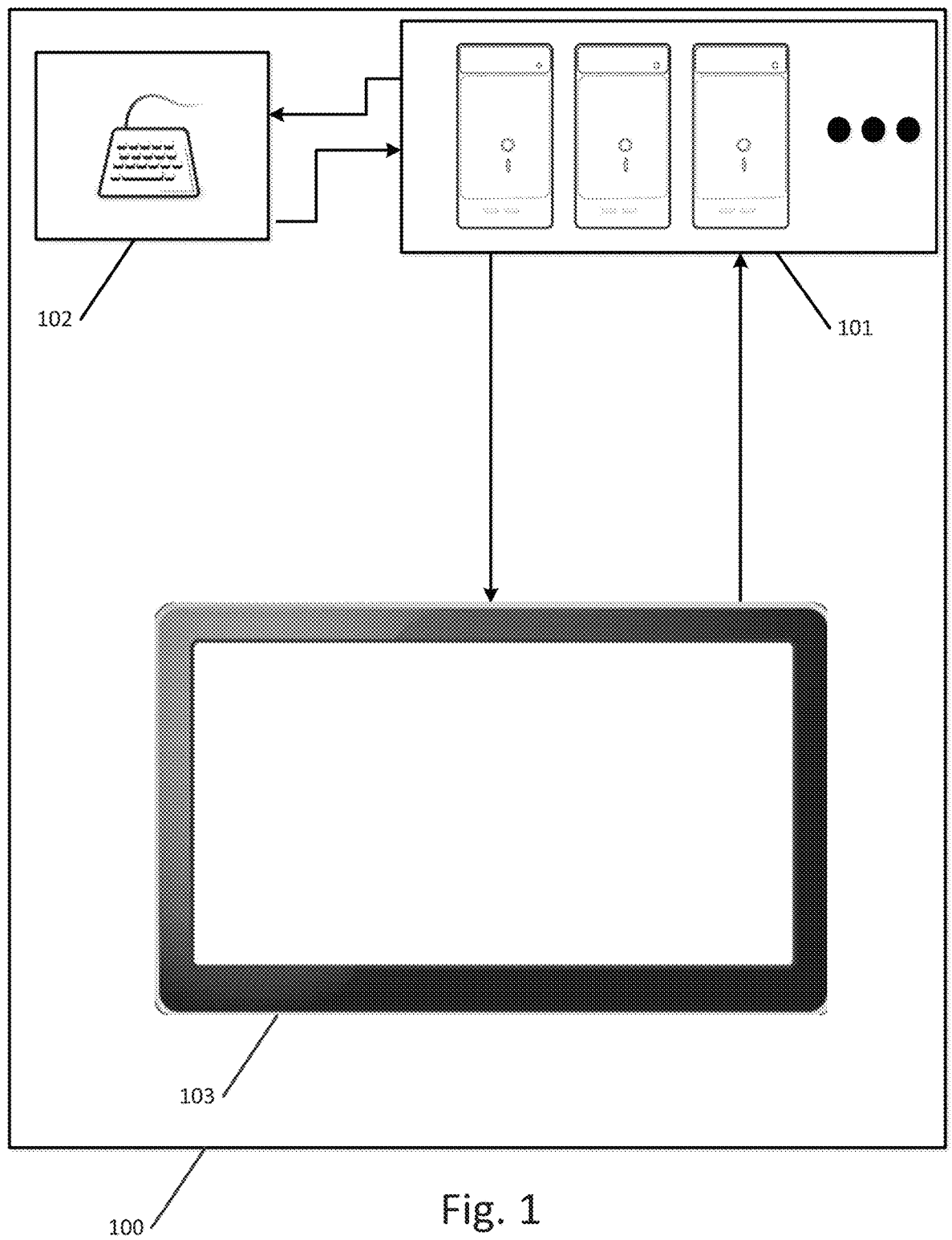
FIG. 1 illustrates an apparatus for executing a multi-player card game on a single display according to an exemplary embodiment.

FIG. 1 illustrates an apparatus 100 for executing a multi-player card game on a single display according to an exemplary embodiment. The apparatus includes one or more computing devices 101 which store computer-readable instructions that, when executed by at least one of the one or more computing devices, cause at least one of the one or more computing devices to generate playing cards corresponding to each player in a plurality of players. The playing cards can be generated based at least in part on a random function, a set of playing cards remaining in a virtual deck of playing cards, and a set of rules corresponding to a card game. For example, if the game is Texas Hold 'Em, a variant of poker, then the rules can specify that two total cards should be generated per player and that one card should be generated for each player before a second card is generated for any player. The rules can also specify the order of generation for each player, based on a location of a "dealer" player.

The apparatus 100 also includes a single display 103 communicatively coupled to at least one of the one or more computing devices 101 and configured to output a plurality of images that are generated by at least one of the one or more computing devices 101 and received from at least one of the one or more computing devices 101 in a plurality of regions of the single display 103. As will be discussed further with reference to FIG. 2, each region in the plurality of regions corresponds to a player in the plurality of players and each region in the plurality of regions is located at a position on the single display 103 which is closer to a physical location reserved for the corresponding player than to any other physical location reserved for any other player. The plurality of images can include a representation of the one or more playing cards corresponding to each player which are generated by at least one of the one or more computing devices 101.

The apparatus 100 further includes an input device 102 configured to receive inputs from the plurality of players and transmit the inputs to at least one of the one or more computing devices 101. The one or more computing devices 101 can be configured to transmit one or more new images to the single display 103 in response to the inputs received by the input device 102. As will be discussed in greater detail, the input device 102 can be an infrared touch panel disposed above the single display. Additionally, input device can be replaced with a plurality of input devices corresponding to the plurality of players. For example, a plurality of keypads, keyboards, joysticks, touchpads, mice, or other input devices. Alternatively, the input device 102 and the single display 103 can be integrated into a single device, such as a capacitive or resistive touch screen.

Figure 2A:
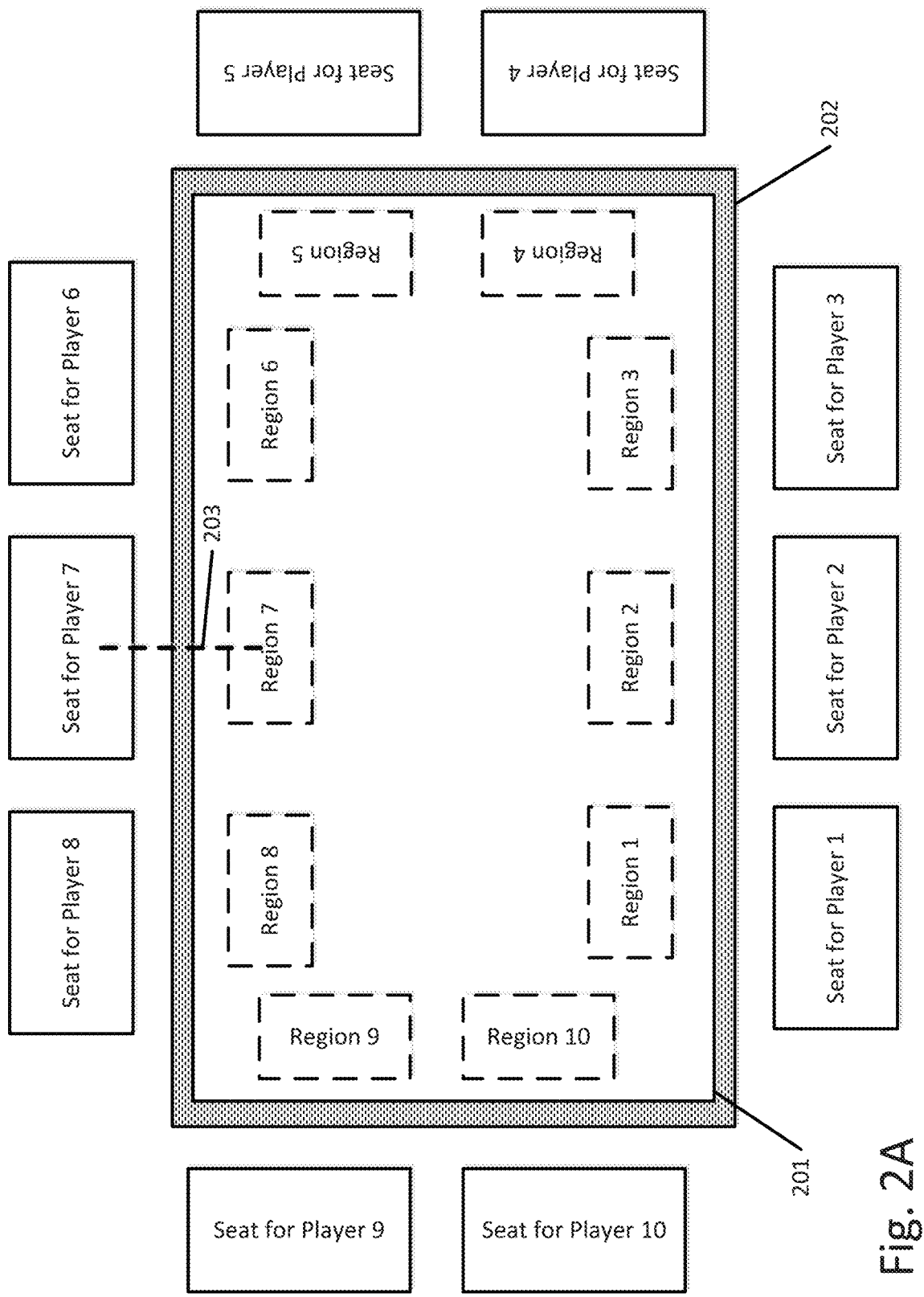
FIGS. 2A-2B illustrate an overhead view of an apparatus for executing a multi-player card game on a single display with respect to the plurality of players that are playing the game according to an exemplary embodiment.

FIG. 2A illustrates an overhead view of an apparatus for executing a multi-player card game on a single display with respect to the plurality of players that are playing the game. As shown in FIG. 2A, the single display 201 can be embedded or mounted in a table 202, such as a traditional poker table.

The one or more computing devices coupled to the single display 201 are not shown, but can be mounted to the underside of the table 202 beneath the single display 201. The table 202 frame and support elements can include openings to permit the wiring of the one or more computing devices to the display 201, as well as the wiring between any input device(s) and the one or more computing devices or the display 201. For example, FIGS. 3A-3D illustrate different perspectives of a table and support elements that can be used in conjunction with the components of the apparatus.

As shown in FIG. 2A, the single display 201 includes 10 regions corresponding to 10 physical locations reserved for 10 players. Each of the regions is located at a position on the single display 201 which is closer to a physical location reserved for the corresponding player than to any other than to any other physical location reserved for any other player. For example, region 7 is closer to the seat for player 7 than to any other seat reserved for any other player. Dashed line 203 indicates the distance from region 7 to the seat for player 7, and as shown, this distance can be measured from the center of the region. As evident from the dashed line 203, this distance is shorter than any other distance between region 7 and any of the other seats.

Each of the regions can be adjacent to the physical location reserved for the corresponding player and non-adjacent to any other physical locations reserved for any other players. For example, region 3 is adjacent to the seat for player 3 but is not adjacent to any other seats.

Figure 2B:
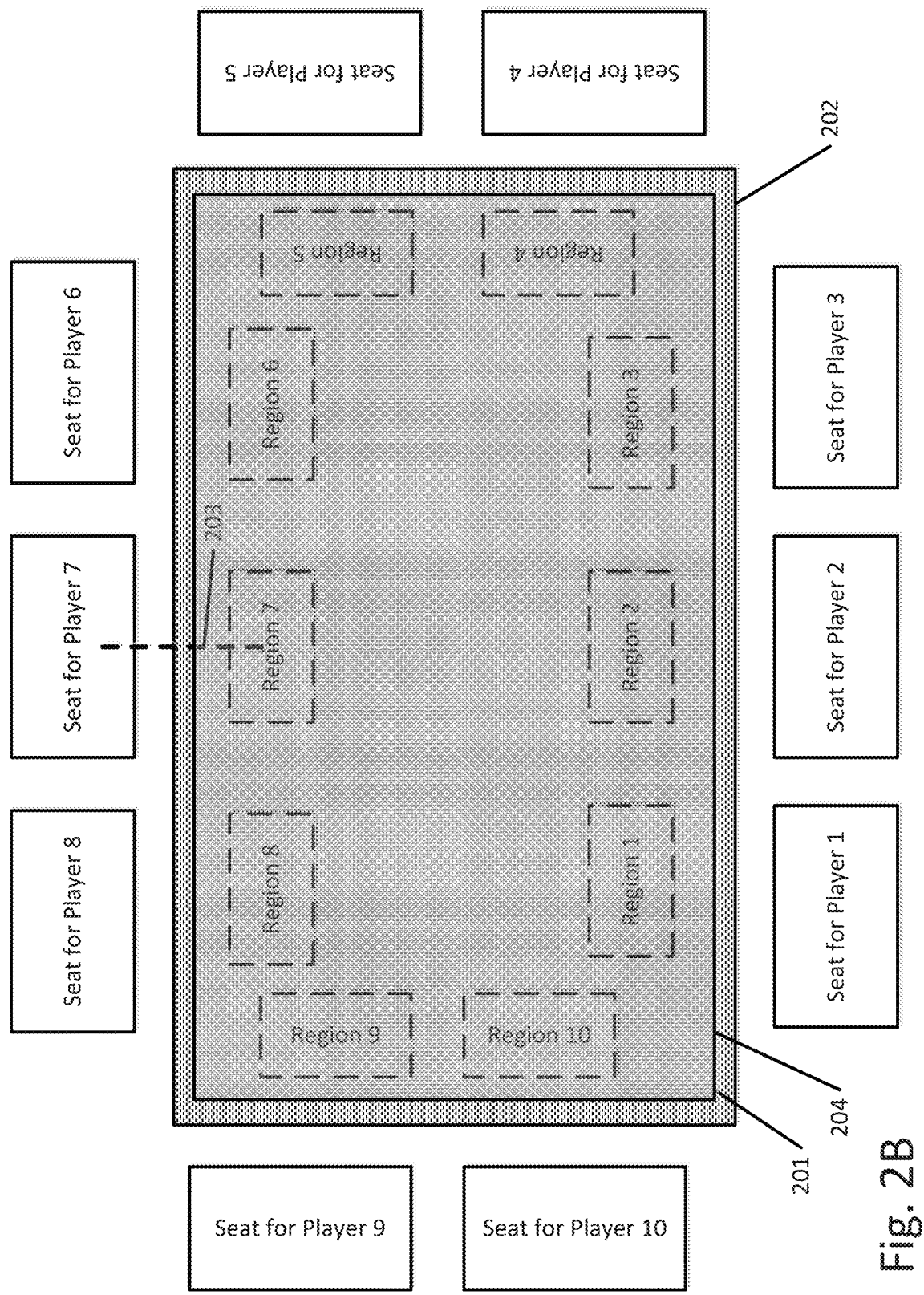
Figure 3A:
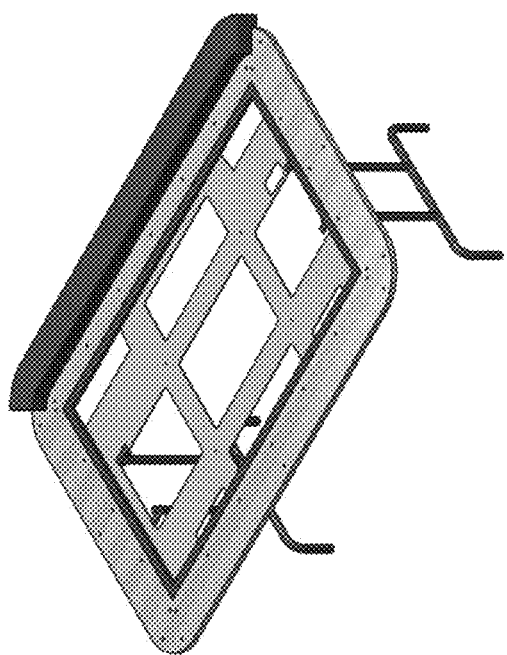
FIGS. 3A-3D illustrate different perspectives of a table and support elements that can be used in conjunction with the components of the apparatus according to an exemplary embodiment.
Figure 3B:
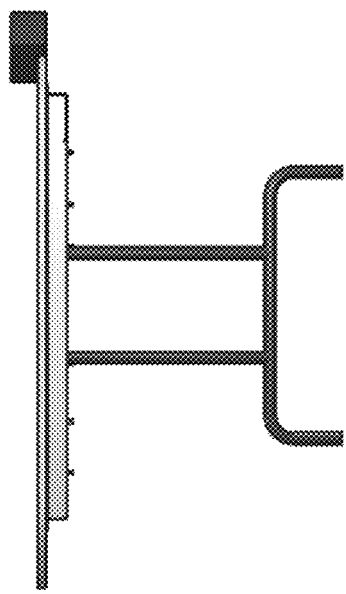
Figure 3C:
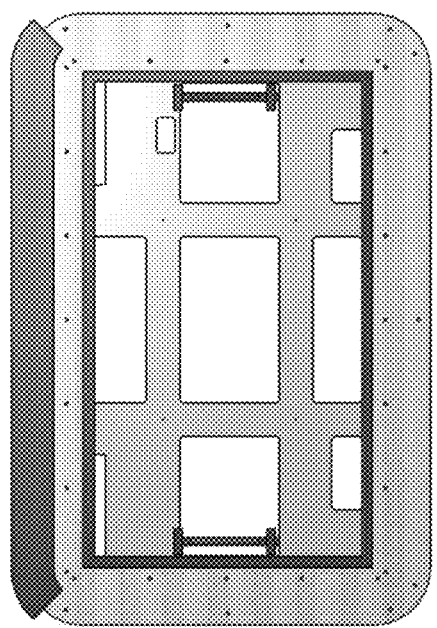
Figure 3D:
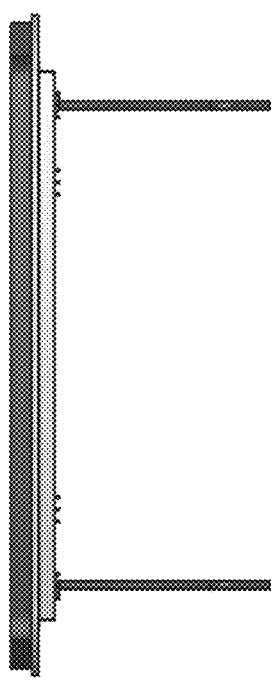

The input device is not shown in FIG. 2A but can be integrated into the display 201, such as by using a display 201 which is touch-sensitive. Alternatively, as shown in FIG. 2B, the input device can be a touch panel 204 (shown with shading) which is disposed above the display 201. The touch panel 204 can be transparent so that players can see the display 201 below the touch panel 204 and can be implemented using infrared sensors or other touch sensing technology. If the input device is implemented as a transparent touch panel 204 above the display 201, then the locations of input options displayed on the display 201 can be mapped to corresponding locations on the touch panel 204 so that a touch gesture received on the touch panel is mapped to the appropriate input command as shown on the display 201. The touch panel 204 can support multi-touch input commands and related touch gestures.

Figure 4:
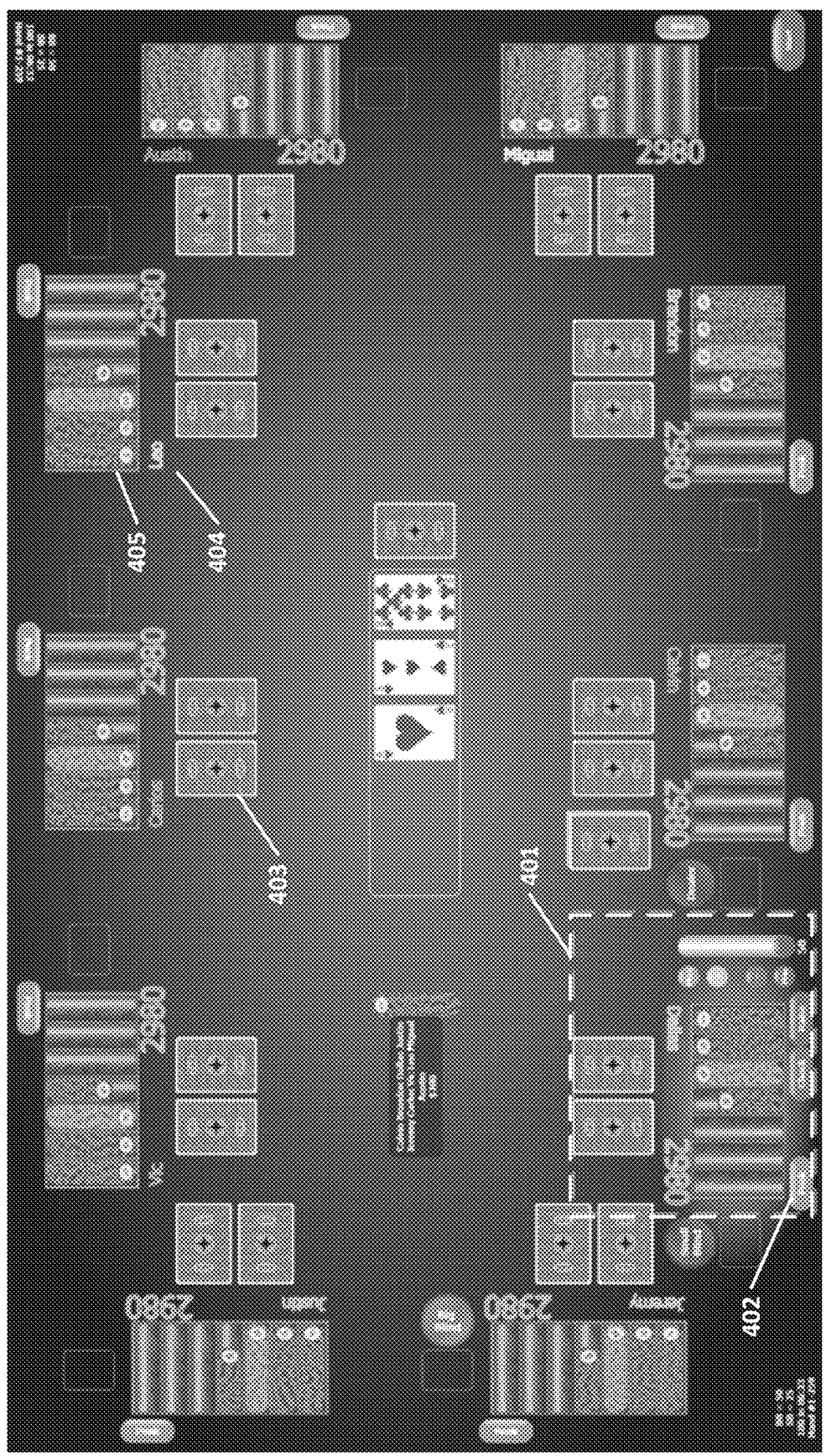
FIG. 4 illustrates the interface of a single display device during the execution of a Texas Hold 'Em game according to an exemplary embodiment.

FIG. 4 illustrates the interface of a single display device 400 during the execution of a Texas Hold 'Em game. As shown in FIG. 4, there are 10 regions of the display device 400 which correspond to 10 different players, such as region 401 corresponding to the player "Dallas." Each of the regions includes a representation of one or more chips corresponding to each player, such as representation 405 of chips corresponding to player "Leo." Additionally, each of the regions can include a representation of the corresponding player name, such as name "Leo" 404. Each of the names can be oriented away from the corresponding player so that it can be read by the other players. Additionally, as shown in FIG. 4, the display includes one or more input commands or options, such as button 402. As discussed earlier, a player can select an input command by touching the relevant command on either the display device 400 (if the display device is touch sensitive) or a transparent touch panel disposed above the display device (if the display device is not touch sensitive). Each of the regions corresponding to each of the players also includes a representation of one or more playing cards "dealt" to that player, such as representation 403. As shown in FIG. 4, the representation of the playing cards for each player can be face-down representation of the playing cards corresponding to the player.

Figure 5:
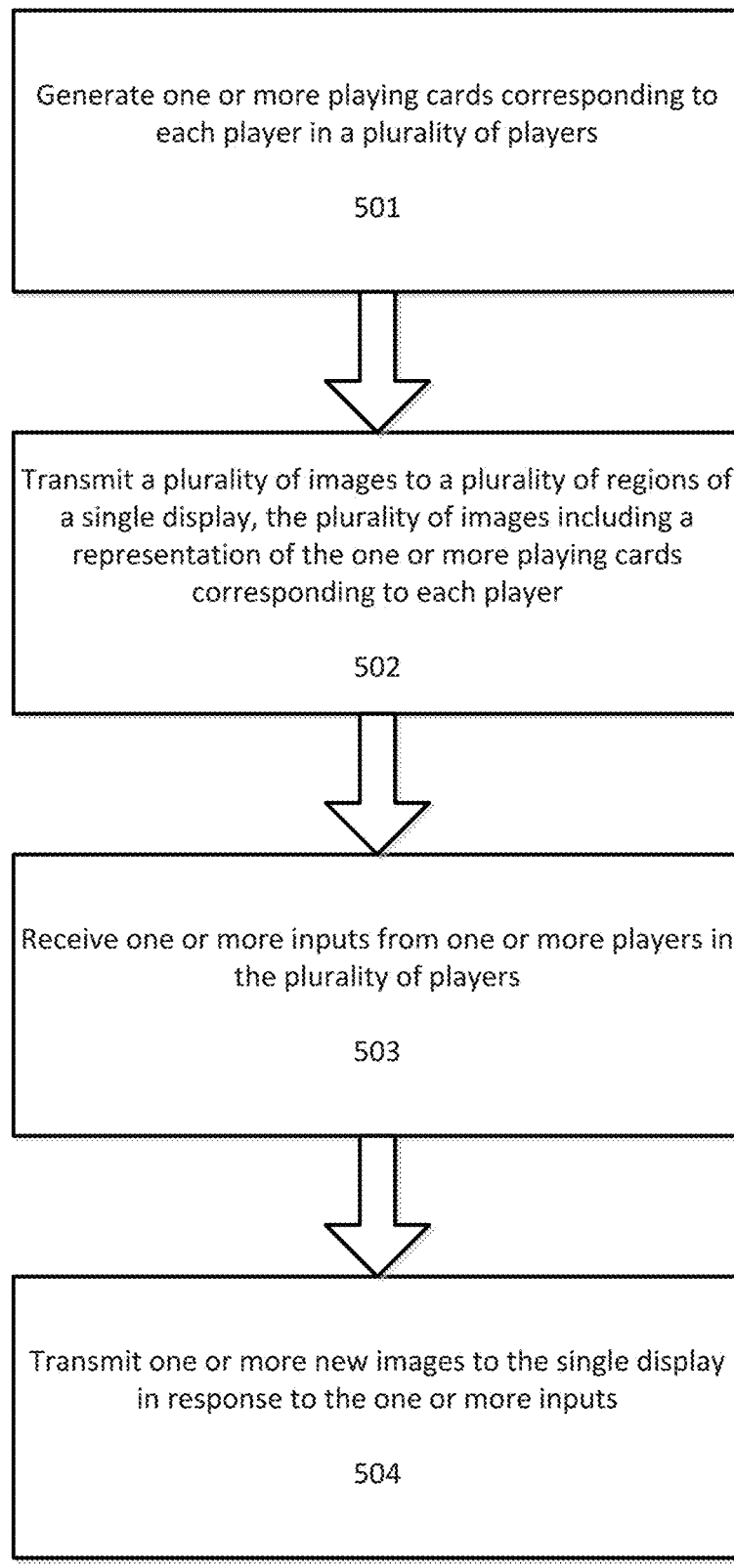
FIG. 5 illustrates a method for executing a multi-player card game on a single display according to an exemplary embodiment.

FIG. 5 illustrates a method for executing a multi-player card game on a single display according to an exemplary embodiment. The method of FIG. 5 and any other methods described herein can be performed using the apparatus described with respect to FIGS. 1-4.

At step 501 one or more playing cards are generated corresponding to each player in a plurality of players. The one or more playing cards can be generated based at least in part on a random function, a set of playing cards remaining in a virtual deck of playing cards, and a set of rules corresponding to a card game.

At step 502 a plurality of images are transmitted to a plurality of regions of a single display, each region in the plurality of regions corresponding to a player in the plurality of players and each region in the plurality of regions being located at a position on the single display which is closer to a physical location reserved for the corresponding player than to any other physical location reserved for any other player. The images include a representation of the one or more playing cards corresponding to each player which were generated at step 501.

At step 503 one or more inputs are received from one or more players in the plurality of players. As discussed in greater detail below, the inputs can include a variety of different inputs, such as a bet (call or raise) command, a check command, a fold command, a peek command (which allows a user to view their face-down cards), a deal command to deal a new hand (which can input by tapping on an image of a deck), a purchase command to buy more chips, an exit command to leave the table, a configuration command to adjust the players at the table or other configuration parameters, or any other inputs relevant to a particular card game. For example, a black jack card game can have a hit command to receive another card, a stay command to stop receiving cards, a double-down command to double a bet, and/or a split command to split pairs.

At step 504 one or more new images are transmitted to the single display in response to the one or more inputs. For example, if the command is a raise command, then the one or more new images can include a representation of the player's chips which shows the chips reduced by a certain amount and another representation of the raised chips which can be transmitted to a central region of the single display which displays the pot. In another example, if the command is a check command, then the one or more new images can include a highlighted image of the region corresponding to the next player indicating that it is their turn to act. In this case, the one or more new images can also include a list of commands for the next player. If the check command is received from the last player to act for a round, then the one or more new images can include transmitting one or more next community cards (in Texas Hold 'Em), such as the flop, the turn, or the river cards.

In another example, when a player folds (such as by selecting the fold command) or otherwise exits a game, the one or more new images can include a darker or lighter representation of the player's chips and name, such that the remaining players in the game are highlighted relative to the players that have folded, have left the game, or are sitting out the hand.

In another example, after a player has raised and all other players have folded, the remaining player can be presented with a peek button, along with a countdown timer. If the remaining player selects the peek button, their cards can be shown to the remaining players in the form of one or more new images transmitted on the display, such as on a central area of the display. If the remaining player does not select the peek button prior to termination of the countdown timer, the cards are not shown and play proceeds to the next hand.

Figure 6:
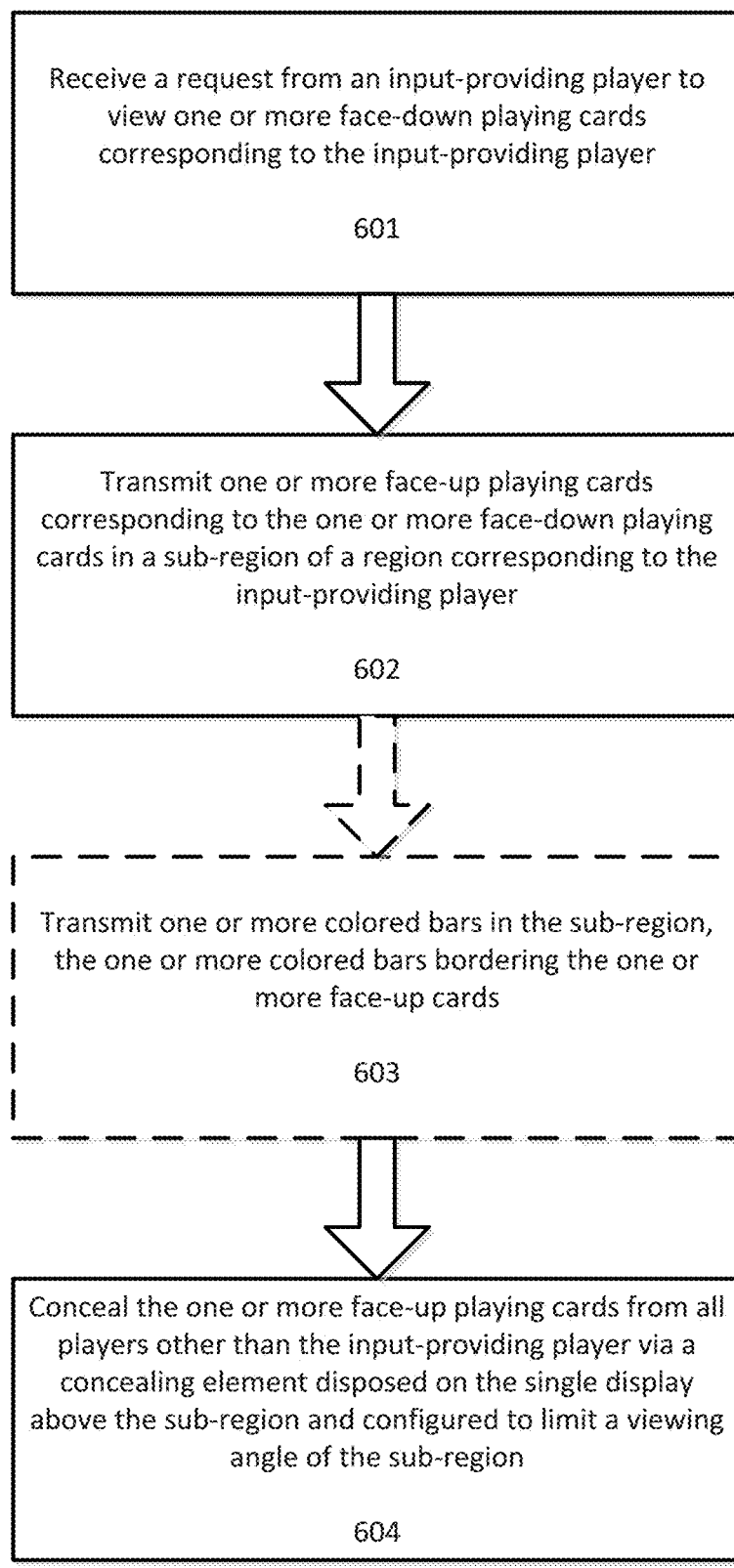
FIG. 6 illustrates a method for revealing one or more face-down cards to a player without revealing the one or more face-down cards to other players according to an exemplary embodiment.

FIG. 6 illustrates a method for revealing one or more face-down cards to a player without revealing the one or more face-down cards to other players according to an exemplary embodiment.

Figure 7A:
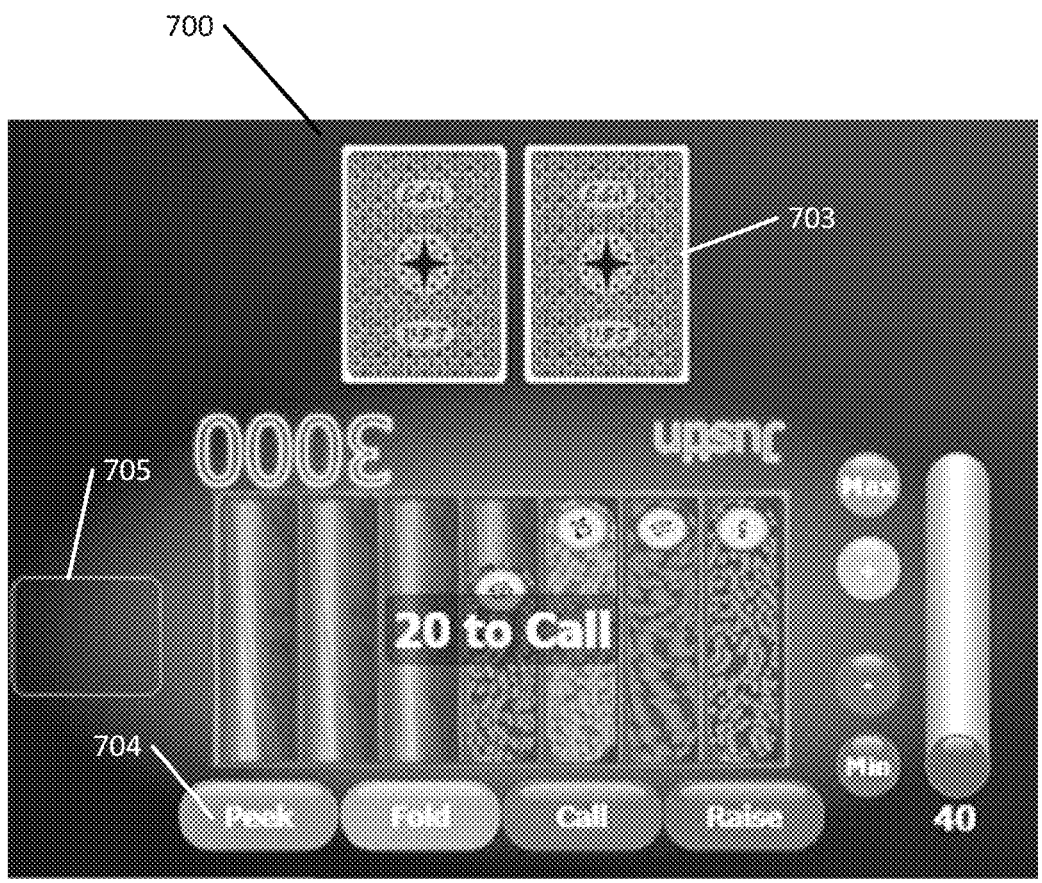
FIGS. 7A-7C illustrate an example of revealing one or more face-down cards to a player according to an exemplary embodiment.

At step 601 a request to view the one or more face-down playing cards corresponding to an input-providing player is received. For example, FIG. 7A illustrates a region 700 of the single display corresponding to a player "Justin." As shown in FIG. 7A, the region 700 includes a representation of two face-down cards 703 which have been dealt to the player. The player can select the peek command 704 to view their face-down cards in the sub-region 705 of region 700.

Figure 7B:
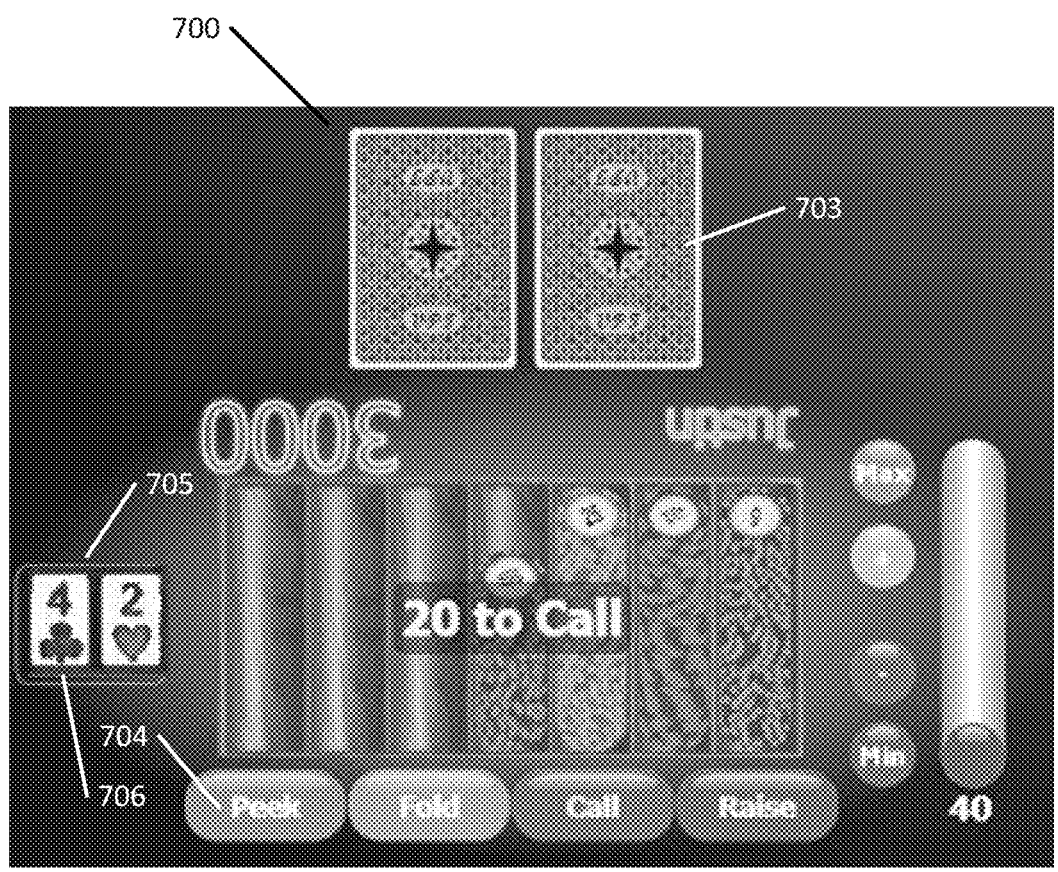

At step 602 of FIG. 6 one or more face-up playing cards corresponding to the one or more face-down playing cards are transmitted to a sub-region of a region corresponding to the input-providing player. This is shown in FIG. 7B, where the input-providing player is "Justin." As shown in FIG. 7B, once the player selects the peek command 704, one or more face-up cards 706 are transmitted to the sub-region 705 of the region 700 which corresponds to the player. These face-up cards 706 correspond to the face-down cards 703 for that player.

One problem with transmitting the face-up cards for a player on the single display is that they can potentially be viewed by other players. Applicant has solved this problem through the use of a novel concealing mechanism and display technique. At optional step 603 one or more colored bars are optionally also transmitted in the sub-region, the one or more colored bars bordering the one or more face-up cards. At step 604 the one or more face-up playing cards are concealed from all players other than the input-providing player via a concealing element disposed on the single display above the sub-region and configured to limit a viewing angle of the sub-region. As an alternative or addition to steps 601-604, the values of the face-up cards can be transmitted to an email account or phone number of the input-providing player when they select the peek command or to all players when a hand is dealt. For example, a text message can be sent to all players at the beginning of the hand with the values of their face-down cards.

Figure 7C:
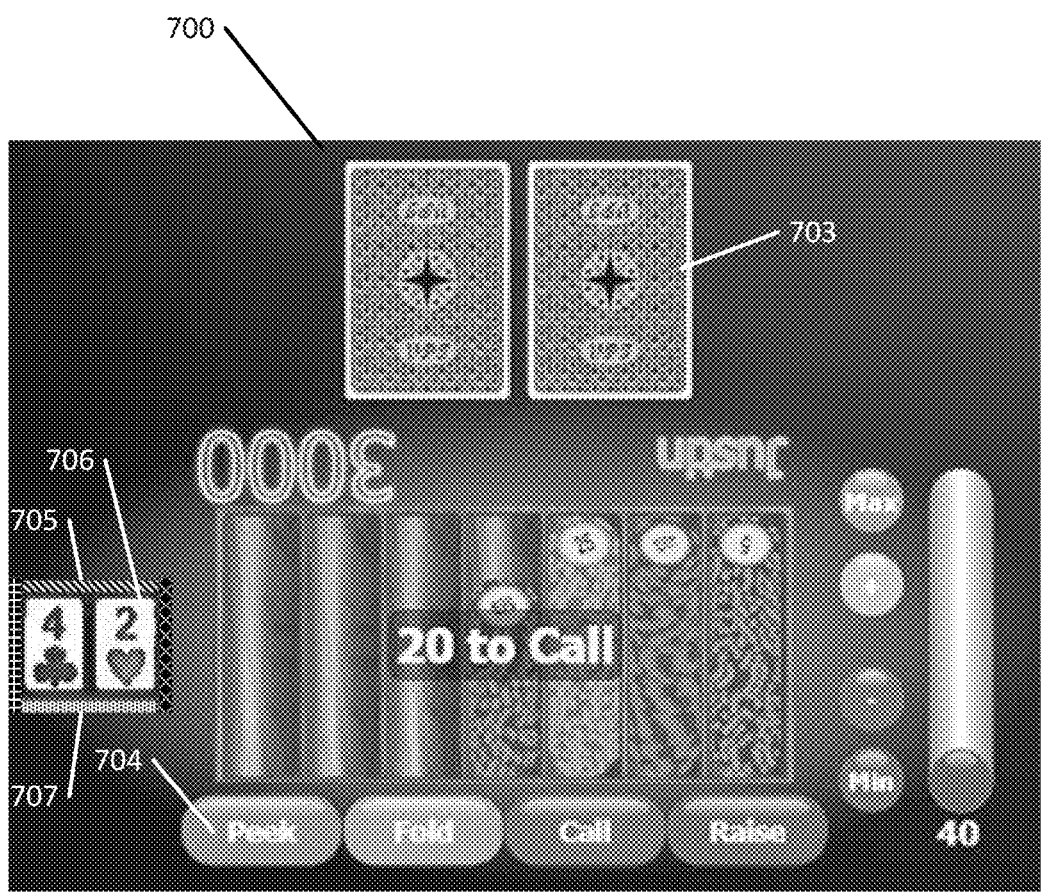

FIG. 7C illustrates the transmission of four colored bars, such as colored bar 707, within sub-region 705 and bordering face-up cards 706. For purposes of reproduction, the colored bars are shown as different textures, but it is understood that the colored bars can be various colors, such as red, purple, blue, etc. The colored bars work in conjunction with the concealing element to prevent players other than the input-providing player from deciphering any information about the revealed face-up cards. Specifically, while the concealing element limits the view of the cards, there is a possibility that the color of the suits of the cards can be given away by reflections if the concealing element is used alone. For example, a strong red reflection or glow could indicate that the face-up cards include one or more diamonds or hearts. The colored bars serve to cancel out the effect of the light given off by the face-up cards by introducing noise, in the form of other random colors.

Figure 8A:
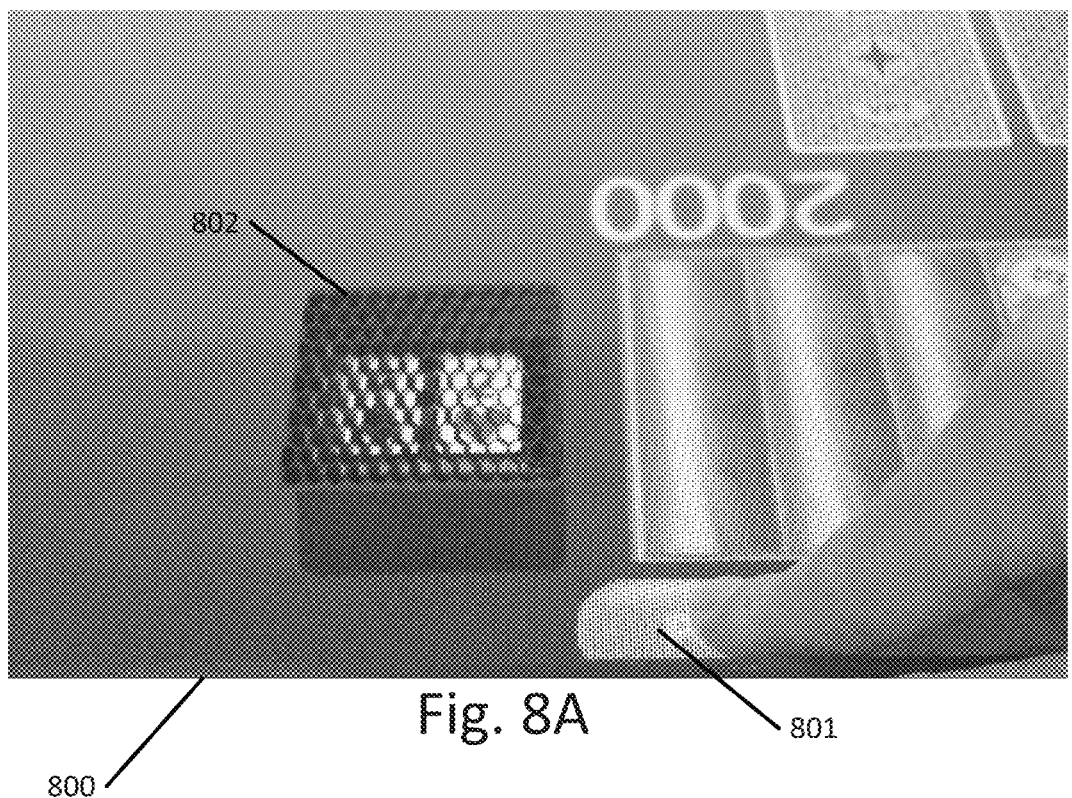

FIG. 8A illustrates a portion of the region 800 corresponding to a player when they have selected the peek command 801. As shown in FIG. 8A, a concealing element 802 completely covers the sub-region where the face-up cards are transmitted and limits the viewing angle of the sub-region to a viewing angle which is only accessible to the input-providing player who selected the peek command.

Figure 8B:
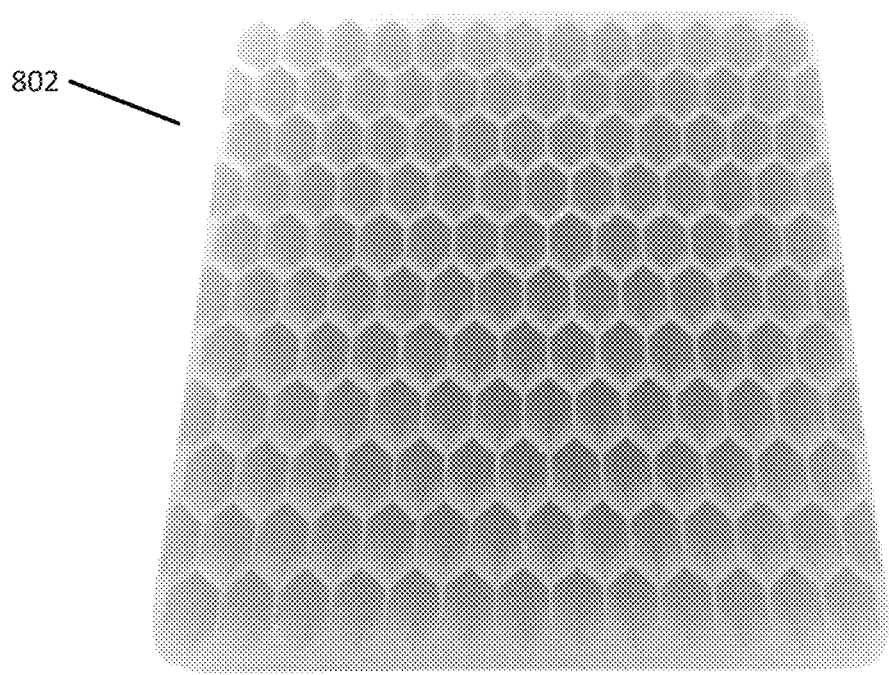

FIG. 8B illustrates the concealing element 802 in greater detail. The concealing element can be a lens, the lens comprising one or more angled planes configured to limit the viewing angle of the sub-region to a viewing area corresponding to a physical location reserved for the input-providing player. For example, if player "Justin" in FIGS. 7A-7C selected the peek command, then the concealing element would limit the viewing angle of sub-region 705 to a viewing area corresponding to the space above the player's seat.

FIGS. 8C-8F illustrate additional views of the concealing element 802. FIG. 8C illustrates a view showing a top face. As shown in FIG. 8C, one dimension (such as the height) of the concealing element 802 can be less than or equal to 0.5 inches. When the input device is a touch panel (such as an infrared panel) disposed above the single display, the concealing element 802 can be disposed between the touch panel and the single display. The small dimension of 0.5 inches enables the concealing element to fit between the touch panel and the single display without interfering with any signals, such as infrared signals, detected by the touch panel.

FIG. 8D illustrates a view of the concealing element 802 showing a front face and a top face. FIG. 8E illustrates a view of the concealing element 802 showing a front face, a top face, and a side face. Additionally, FIG. 8F illustrates a view of the concealing element 802 showing a side face. As shown in FIG. 8F, the concealing element is angled. In practice, an angle of 67½ degrees has proven effective at concealing a sub-region from other players.

FIG. 9 illustrates a concealing element 901 disposed on the surface of the single display 900. Numeral 902 indicates one dimension of the sub-region which is entirely covered by the concealing element 901. As shown in FIG. 9, the viewing angle of the sub-region is limited to a viewing area 903 which is only accessible to the player corresponding to the region which includes the sub-region being concealed.

Figure 10B:
FIGS. 10A-10E illustrate steps in the fabrication process for generating a lens concealing element according to an exemplary embodiment.
Figure 10D:
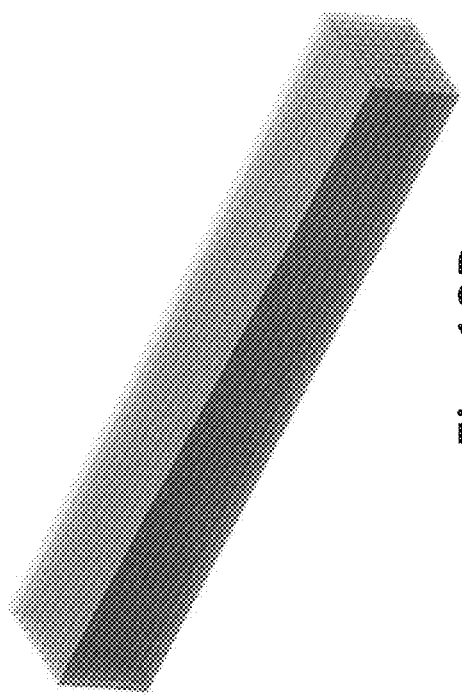
Figure 10A:
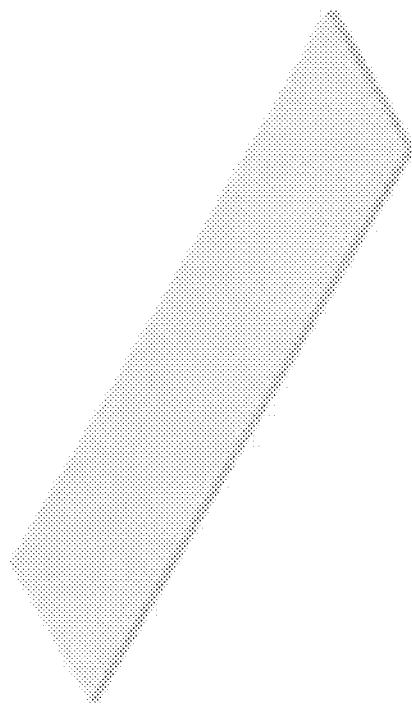
Figure 10C:
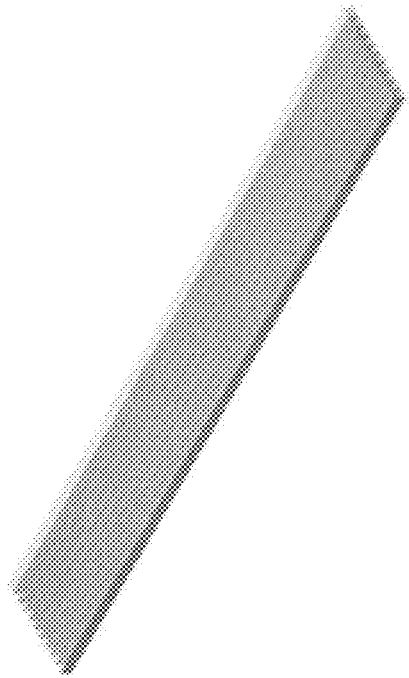
Figure 10E:
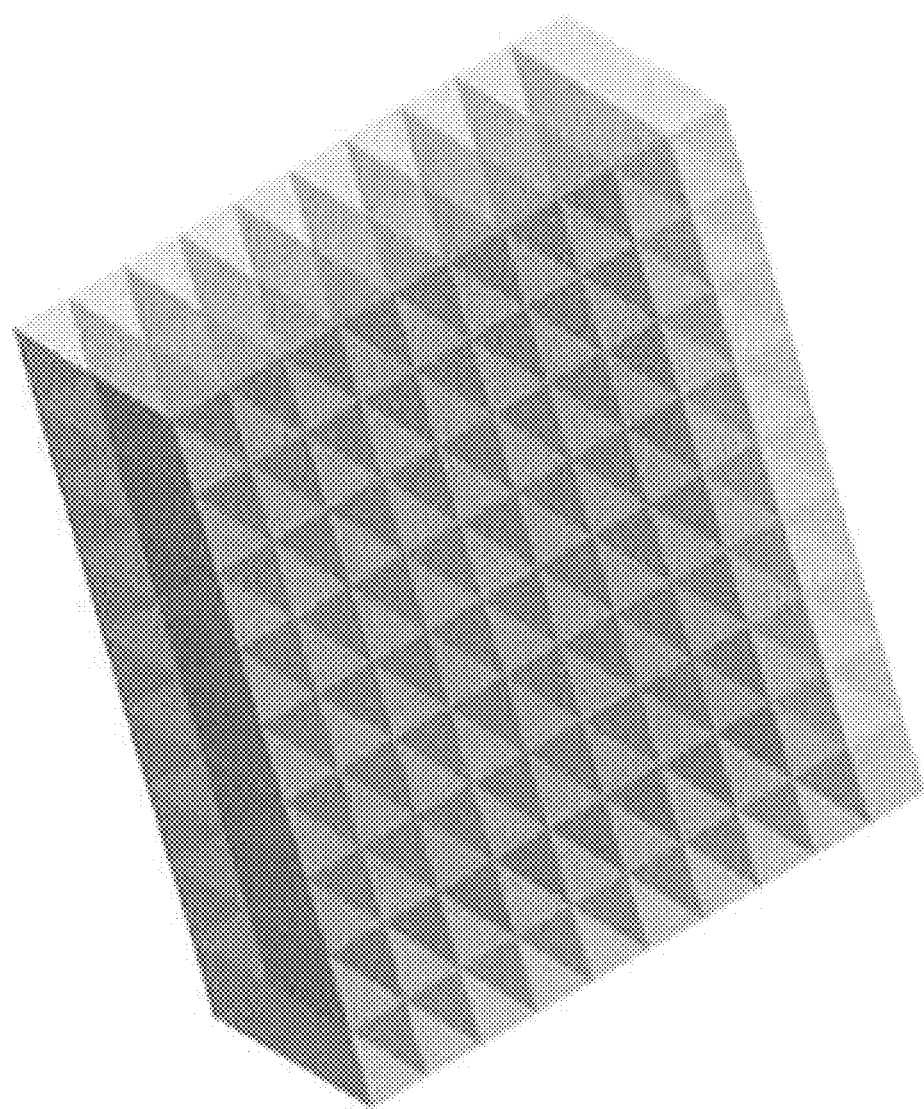

FIGS. 10A-10D illustrates steps in the fabrication process for generating a lens concealing element. Several ¼ inch thick Plexiglas sheets, such as the sheet shown in FIG. 10A, are glued together using opaque glue to generate the bar shown in FIG. 10B. The bar is then cut in a direction intersecting the combined sheets to create ¼ inch sheets, such as the sheet shown in FIG. 10C. Those sheets are then glued back together using opaque glue to generate the bar shown in FIG. 10D. The bar is then cut to ½ inch thick slices at 67½ degrees. Each of those slices are then squared and all sides of the slices are polished. The resulting lens concealing element is shown in FIG. 10E and only allows viewing from a limited viewing angle in one direction.

Figure 11:
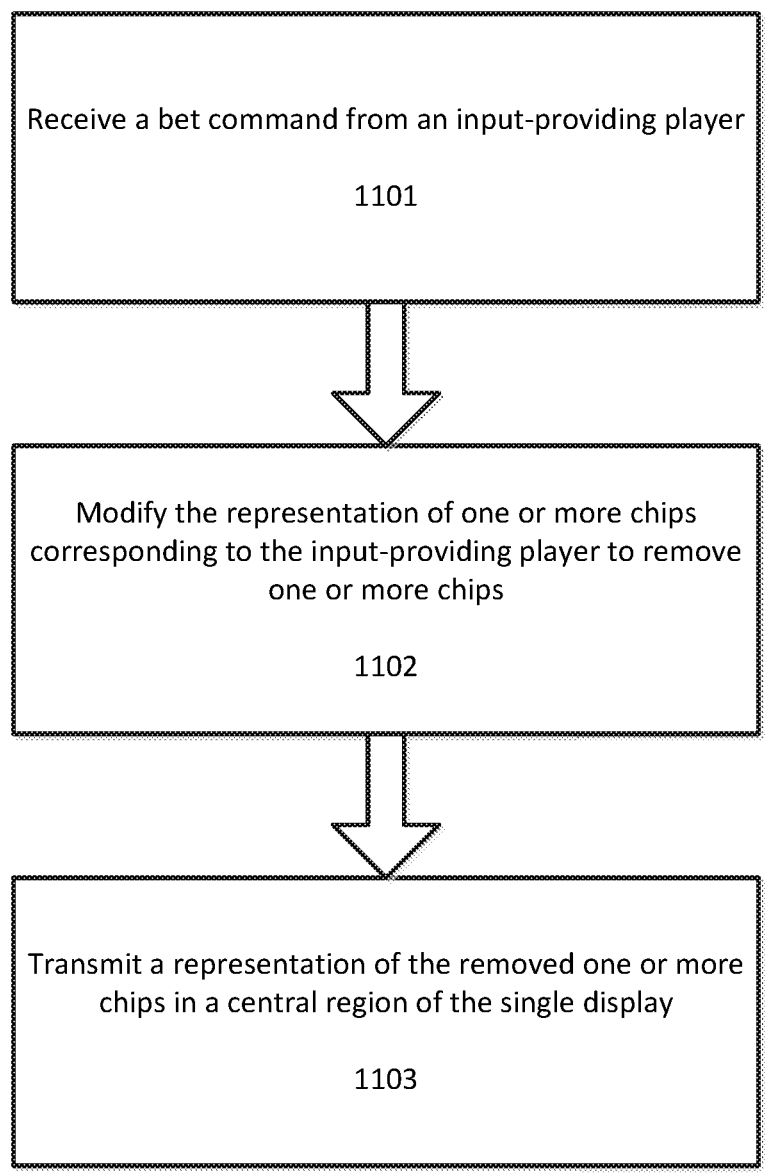
FIG. 11 illustrates a method for executing a bet command according to an exemplary embodiment.

FIG. 11 illustrates a method for executing a bet command according to an exemplary embodiment. At step 1101 a bet command is received from an input-providing player. In poker, this bet command can be a raise command or a call command to match another players bet. At step 1102 a representation of one or more chips corresponding to the input-providing player is modified to remove one or more chips. For example, this modification can take the form of transmitting a new modified image showing less chips corresponding to the input-providing player. At step 1103 a representation of the removed one or more chips is transmitted to a central region of the single display. For example, if there are already a number of chips in a central region of the single display (the existing pot), then a new image can be transmitted to the central region which includes the existing chips and the chips removed from the player.

Figure 12:
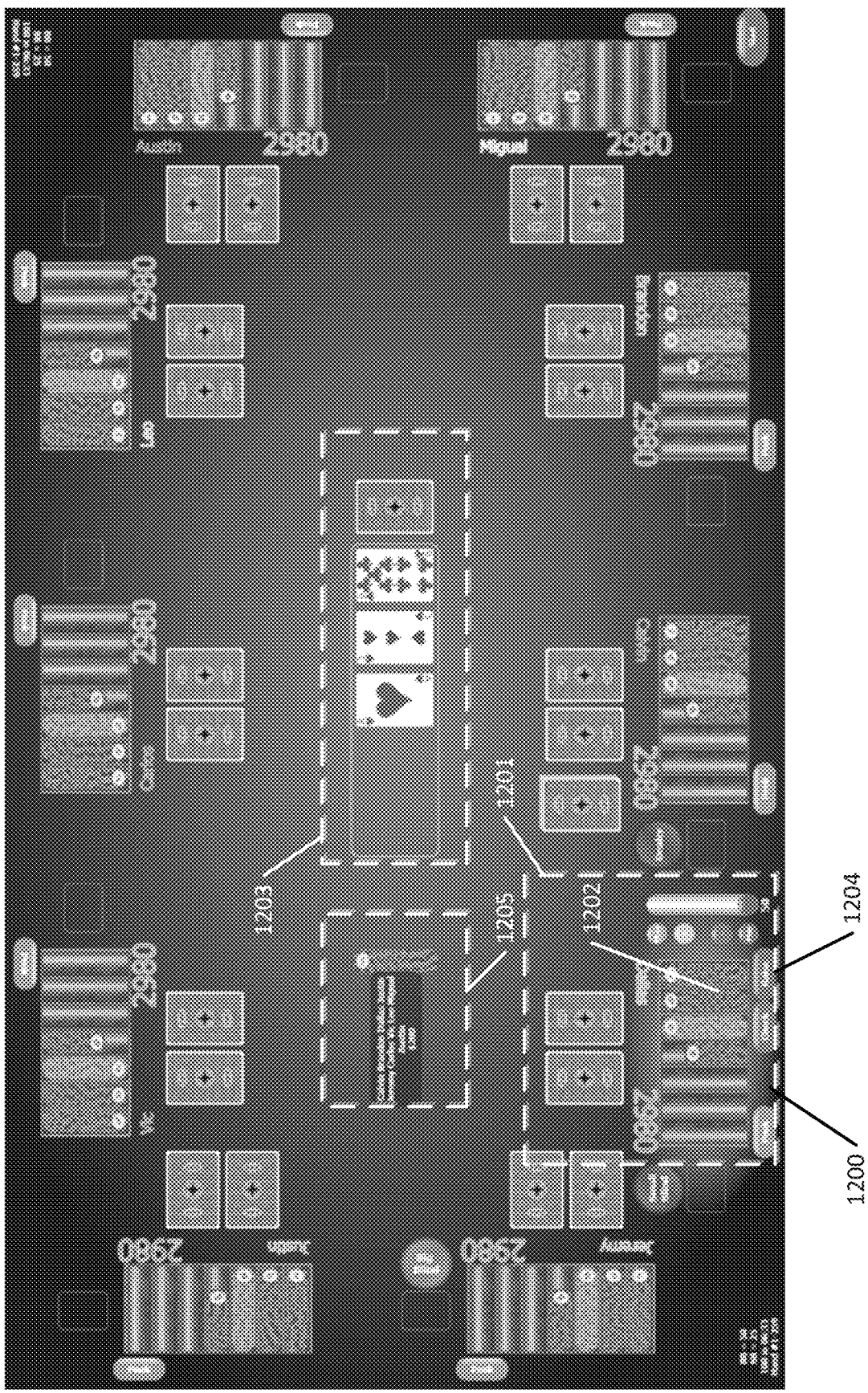
FIG. 12 illustrates an interface of a single display when executing a Texas Hold 'Em poker game according to an exemplary embodiment.

FIG. 12 illustrates an interface of a single display 1200 when executing a Texas Hold 'Em poker game. As discussed before, the display 1200 includes a region corresponding to each player, such as region 1201 corresponding to player "Dallas." Within region 1201 is a representation of one or more chips 1202 corresponding to player "Dallas." Also shown is a first central region 1203 of the display 1200 which shows a representation of community cards that have been dealt already and a second central region 1205 which shows a representation of chips which all players have bet and are in the pot for the hand.

As shown in FIG. 12, player Dallas can either check or raise. If player Dallas were to select the raise button 1204, then the representation of one or more chips 1202 could be modified to remove 20 dollars of chips and a representation of the removed chips could be transmitted to central region 1205 to show they have been added to the pot.

Figure 13:
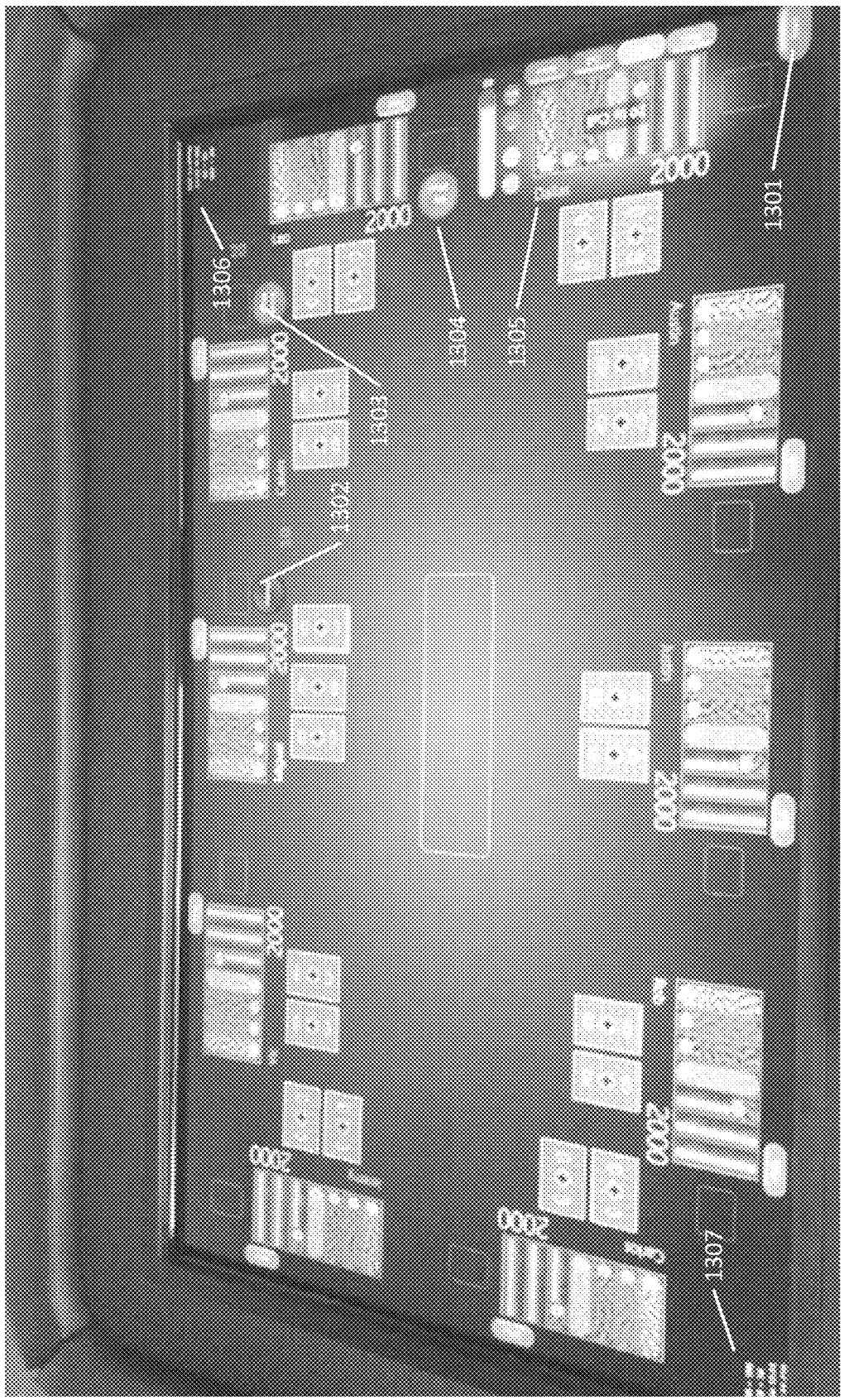
FIG. 13 illustrates additional images that can be transmitted to the single display according to an exemplary embodiment.

FIG. 13 illustrates additional images that can be transmitted to the single display according to an exemplary embodiment. As shown in FIG. 13, the single display can also include images representing a current dealer 1302, a small blind 1303, a big blind 1304, and player names, such as name 1305. Additionally, the single display can include one or more information boxes, such as boxes 1306 and 1307, which indicate the current blinds (minimum bets), the current dealer, the game number (in case of tournaments), the hand number, and/or an interval until the blinds are raised.

Figure 14:
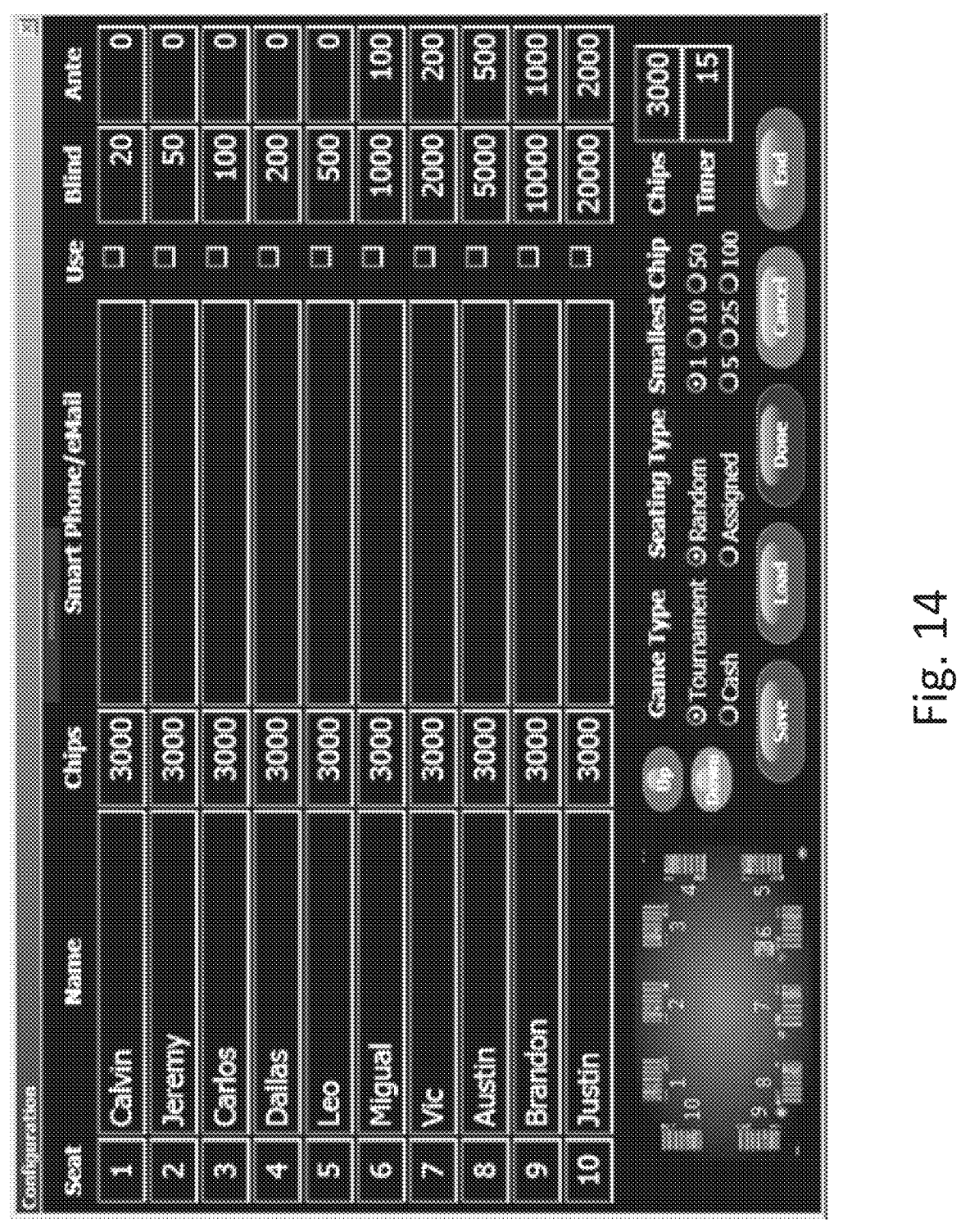

As shown in FIG. 13, there is also a start button 1301 which can be used to set up the game or to enter a configuration screen. FIG. 14 illustrates a configuration interface that can be displayed on the single display when the start button 1301 of FIG. 13 is selected.

As shown in FIG. 14, the configuration interface allows users to enter names and chip amounts. This can be used be a new player joins, when a player wishes to cash out, or when a player wishes to buy more chips. Additionally, the configuration interface allows users to select which blind amounts they would like to use, a game type (tournament or cash), a seating type, a chip denomination, and/or a timer between blind increases. The configuration interface also allows users to enter a phone number or email address for each player. When a hand is dealt, the face-up values of the face-down cards for each player can be transmitted to the corresponding phone number or email address for that player. This enables a player to check the values of their face-down cards without selecting the peek command.

Figure 15:
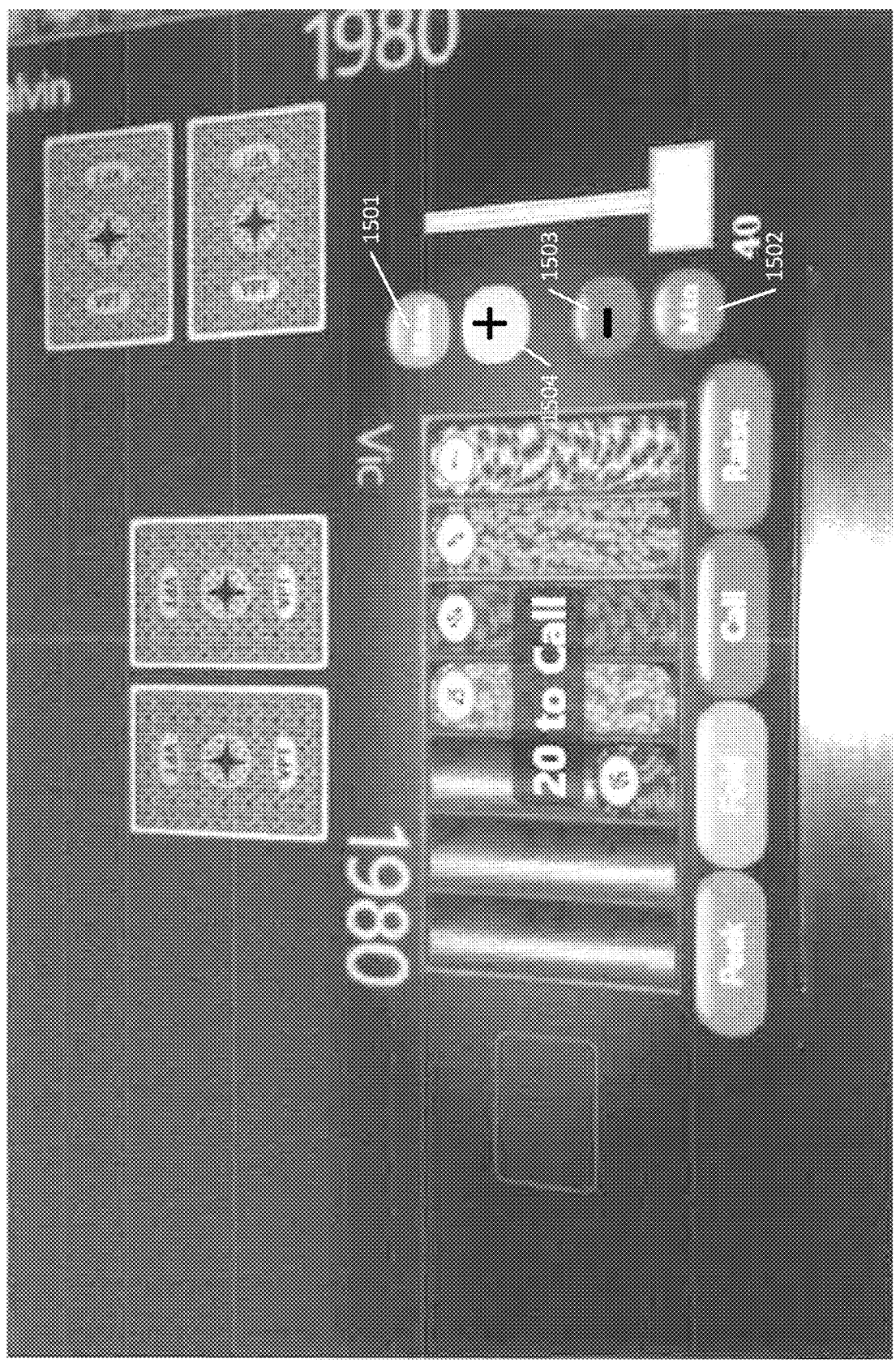
FIG. 15 illustrates additional aspects of each region corresponding to each player according to an exemplary embodiment.

FIG. 15 illustrates additional aspects of each region corresponding to each player according to an exemplary embodiment. When it is a player's turn to act, their region can be highlighted on the display. Additionally, one or more images corresponding to input command can be transmitted to their region. As shown in FIG. 15, these can include a minimum bet button 1502, a maximum bet button 1501, an increase bet button 1504, and a decrease bet button 1503.

Figure 16A:
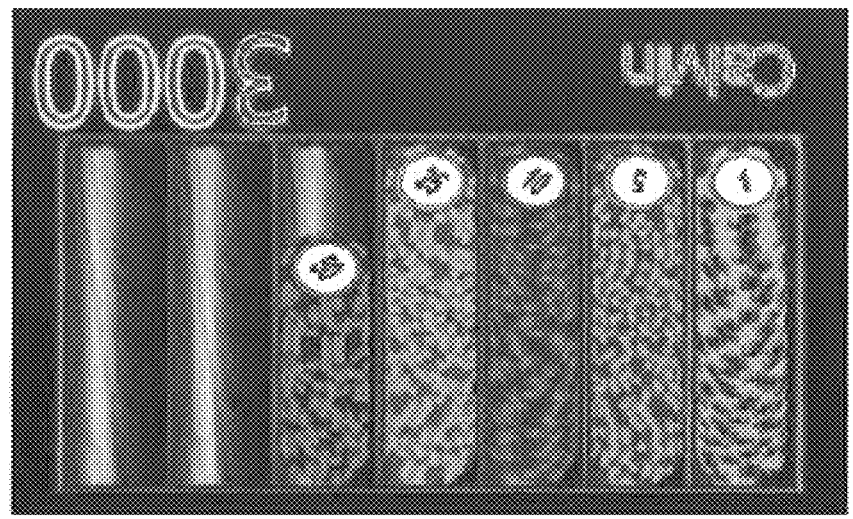
FIGS. 16A-16B illustrate a chip exchange according to an exemplary embodiment.
Figure 16B:
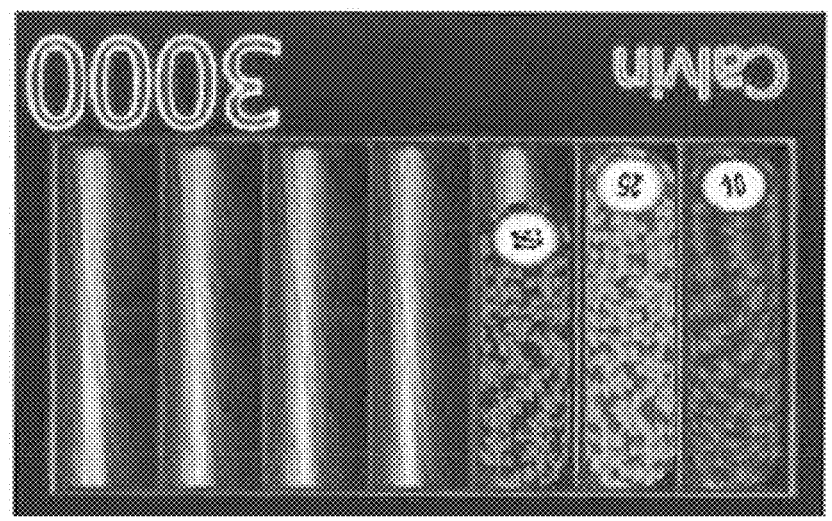

FIGS. 16A-16B illustrate a chip exchange according to an exemplary embodiment. As shown in FIG. 16A, a region corresponding to a player can include a representation of chips corresponding to that player. The player can input a request to exchange their chips for a higher denomination, such as by selecting the start command and selecting an appropriate option or otherwise inputting the request. In response to the request, a new representation of the chips corresponding to that player can be transmitted to the player's region, as shown in FIG. 16B.

Figure 17A:
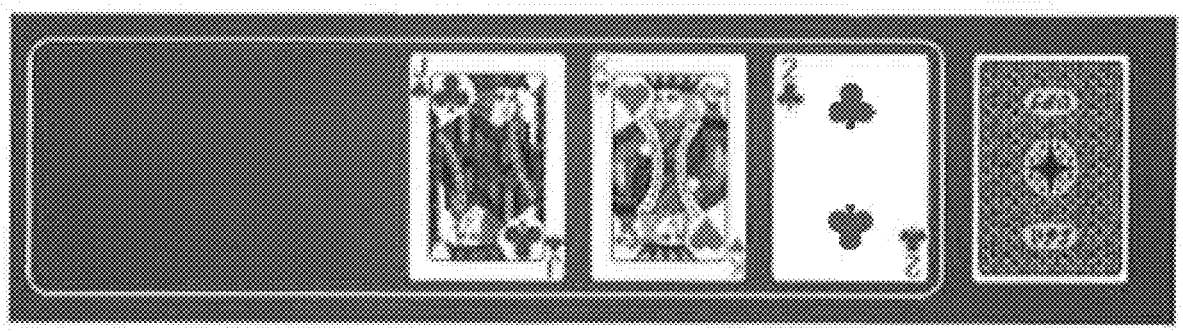
FIGS. 17A-17B illustrate central regions of the single display according to an exemplary embodiment.
Figure 17B:
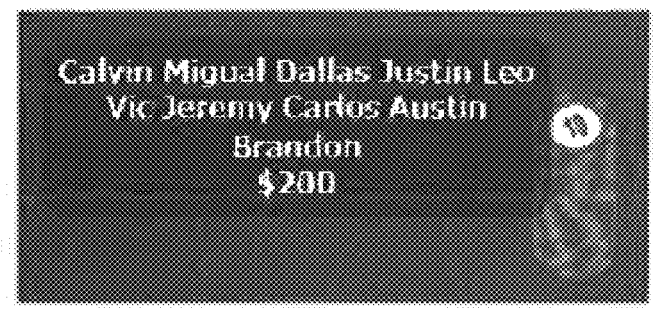
Figure 17C:
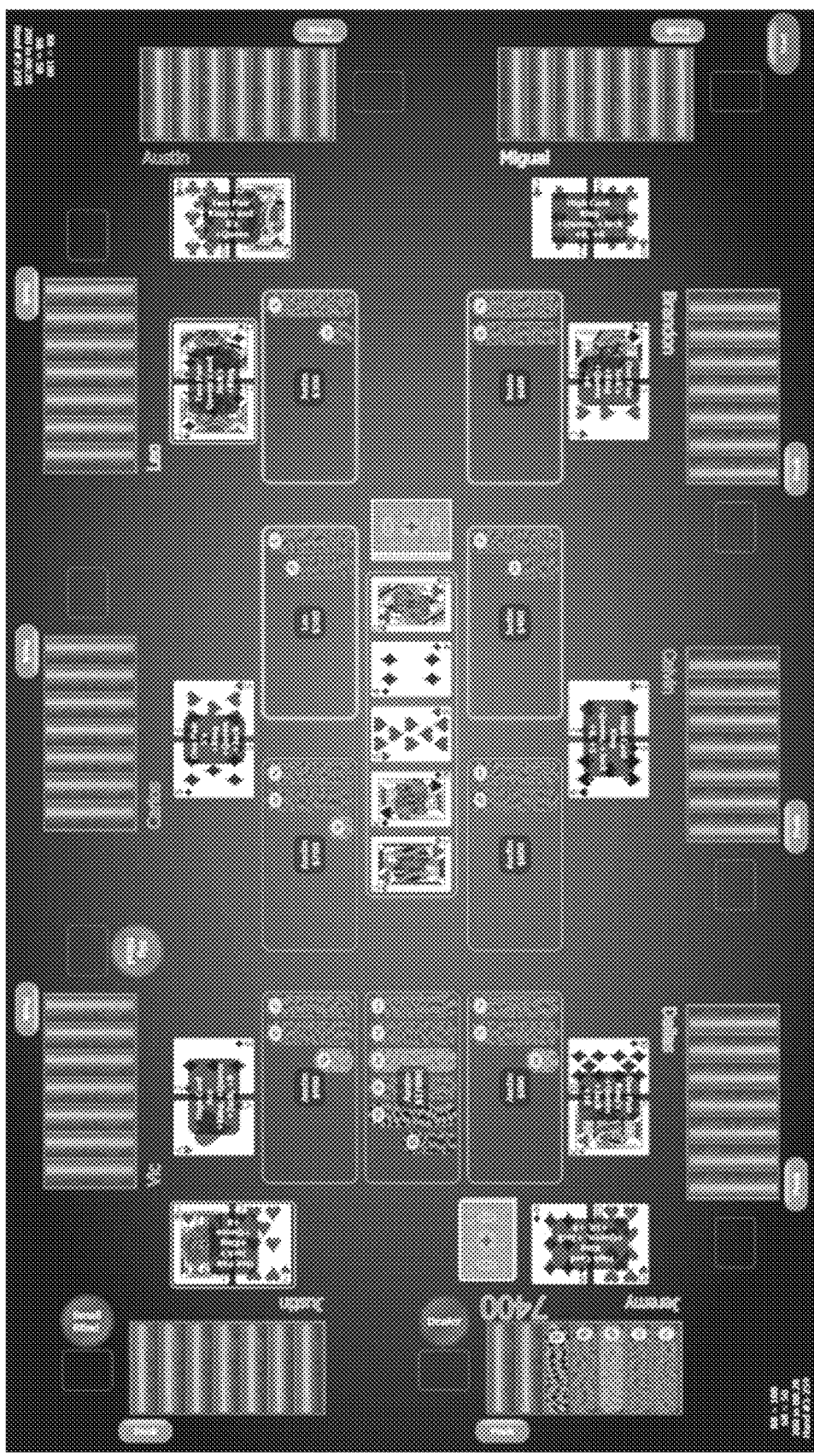
FIG. 17C illustrates an interface of the single display when executing a Texas Hold 'Em poker game in which multiple side pots have been created according to an exemplary embodiment.

FIG. 17A illustrates a central region corresponding to central region 1203 in FIG. 12. As shown in FIG. 17A, this central region displays the cards that have been dealt in the hand. FIG. 17B illustrates a central region corresponding to central region 1205 in FIG. 12, and includes a representation of the chips in the pot, along with a numerical indictor of the total pot size and the players that are eligible to win that pot. This central region can be used to transmit representations of one or more additional "side-pots" with corresponding numerical indictors of the side-pots and players eligible to win the side pots. For example, if a player is all-in (has bet all of their remaining chips) but the other players wish to continue betting, then one or more side pots can be represented. FIG. 17C illustrates an interface 1700 of the single display when executing a Texas Hold 'Em poker game in which multiple side pots have been created. As shown in FIG. 17C, at the end of the hand, the winner of each side pot is indicated, along with the pot amount.

Figure 18:
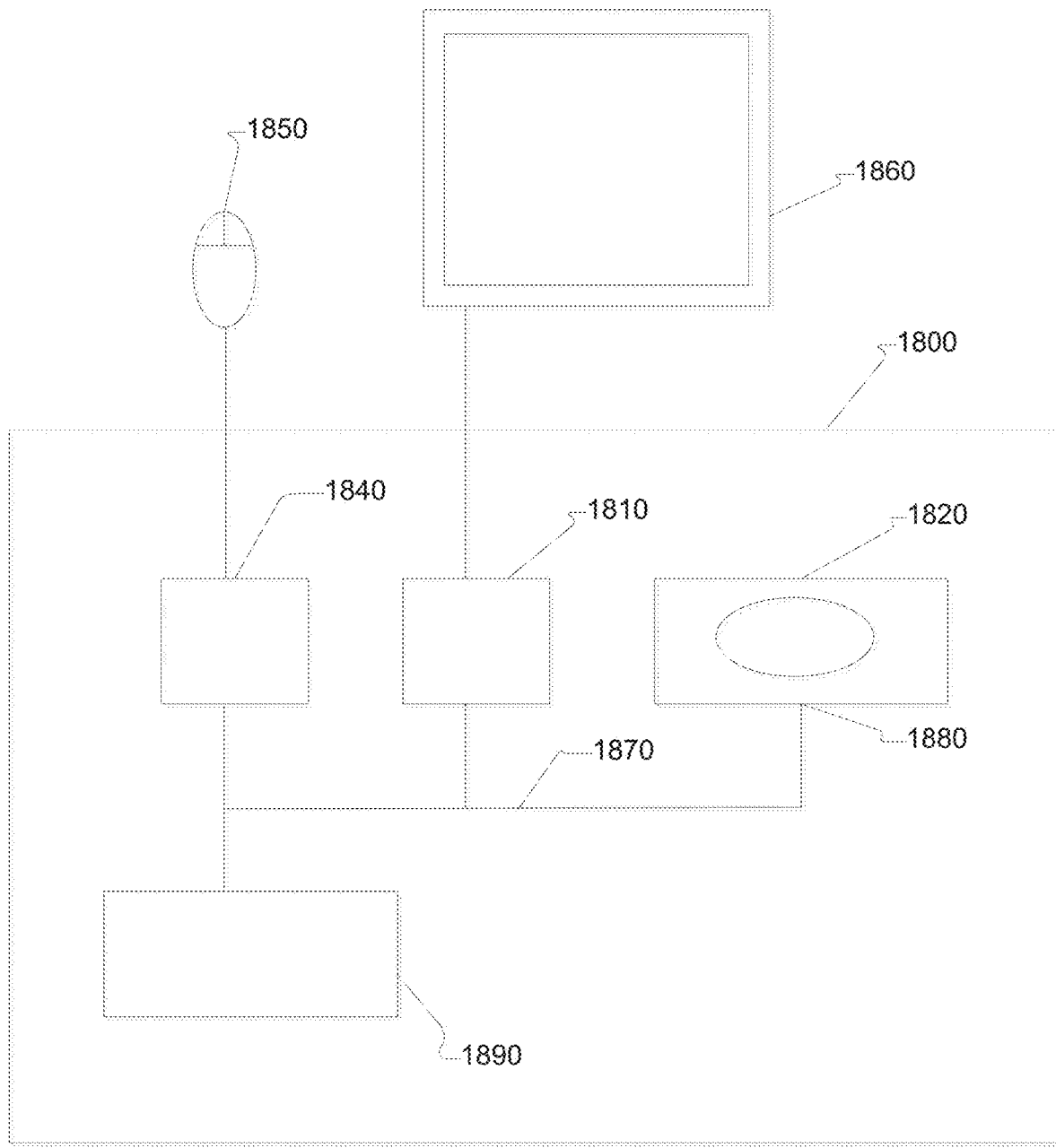
FIG. 18 illustrates an exemplary computing environment that can be used to carry out the method for executing a multi-player card game on a single display according to an exemplary embodiment.

One or more of the above-described techniques can be implemented in or involve one or more computer systems. FIG. 18 illustrates a generalized example of a computing environment 1800. The computing environment 1800 is not intended to suggest any limitation as to scope of use or functionality of a described embodiment.

The computing environment 1800 includes at least one processing unit 1810 and memory 1820. The processing unit 1810 executes computer-executable instructions and can be a real or a virtual processor. In a multi-processing system, multiple processing units execute computer-executable instructions to increase processing power. The memory 1820 can be volatile memory (e.g., registers, cache, RAM), non-volatile memory (e.g., ROM, EEPROM, flash memory, etc.), or some combination of the two. The memory 1820 can store software 1880 implementing described techniques.

A computing environment can have additional features. For example, the computing environment 1800 includes storage 1840, one or more input devices 1850, one or more output devices 1860, and one or more communication connections 1890. An interconnection mechanism 1870, such as a bus, controller, or network interconnects the components of the computing environment 1800. Typically, operating system software or firmware (not shown) provides an operating environment for other software executing in the computing environment 1800, and coordinates activities of the components of the computing environment 1800.

The storage 1840 can be removable or non-removable, and includes magnetic disks, magnetic tapes or cassettes, CD-ROMs, CD-RWs, DVDs, or any other medium which can be used to store information and which can be accessed within the computing environment 1800. The storage 1840 can store instructions for the software 1880.

The input device(s) 1850 can be a touch input device such as a keyboard, mouse, pen, trackball, touch screen, or game controller, a voice input device, a scanning device, a digital camera, remote control, or another device that provides input to the computing environment 1800. The output device(s) 1860 can be a display, television, monitor, printer, speaker, or another device that provides output from the computing environment 1800.

The communication connection(s) 1890 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1800, computer-readable media include memory 1820, storage 1840, communication media, and combinations of any of the above.

Of course, FIG. 18 illustrates computing environment 1800, display device 1860, and input device 1850 as separate devices for ease of identification only. Computing environment 1800, display device 1860, and input device 1850 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1800 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto

What is claimed is:

1. An apparatus for executing a multi-player card game on a single display, the apparatus comprising:
 one or more computing devices storing computer-readable instructions that, when executed by at least one of the one or more computing devices, cause at least one of the one or more computing devices to generate one or more playing cards corresponding to each player in a plurality of players, wherein the one or more playing cards are generated based at least in part on a random function, a set of playing cards remaining in a virtual deck of playing cards, and a set of rules corresponding to a card game;
 a single display communicatively coupled to at least one of the one or more computing devices and configured to output a plurality of images received from at least one of the one or more computing devices in a plurality of regions of the single display, wherein each region in the plurality of regions corresponds to a player in the plurality of players, wherein each region in the plurality of regions is located at a position on the single display which is closer to a physical location reserved for the corresponding player than to any other physical location reserved for any other player, and wherein the plurality of images comprise a representation of the one or more playing cards corresponding to each player;
an input device configured to receive one or more inputs from one or more players in the plurality of players and transmit the one or more inputs to at least one of the one or more computing devices, wherein at least one of the one or more computing devices is configured to transmit one or more new images to the single display in response to the one or more inputs;
wherein the representation of the one or more playing cards corresponding to each player comprises one or more face-down playing cards corresponding to each player,
wherein an input in the one or more inputs comprises a request to view the one or more face-down playing cards corresponding to an input-providing player in the one or more players,
wherein the one or more new images comprise one or more face-up playing cards corresponding to the one or more face-down playing cards, and
wherein at least one of the one or more computing devices is configured to transmit the one or more face-up playing cards to a sub-region of a region corresponding to the input-providing player; and
wherein the one or more new images further comprise one or more colored bars, and
wherein at least one of the one or more computing devices is configured to transmit the one or more colored bars in the sub-region, the one or more colored bars bordering the one or more face-up cards.

2. The apparatus of claim 1, wherein each region in the plurality of regions is located at a position on the single display which is adjacent to the physical location reserved for the corresponding player.

3. The apparatus of claim 1, wherein the input device is a touch interface integrated with the single display.

4. The apparatus of claim 1, further comprising:
a concealing element disposed on and fixed relative to the single display above the sub-region and configured to conceal the one or more face-up playing cards from all players other than the input-providing player by limiting a viewing angle of the sub-region.

5. The apparatus of claim 4, wherein the concealing element comprises a lens, the lens comprising one or more angled planes configured to limit the viewing angle of the sub-region to a viewing area corresponding to a physical location reserved for the input-providing player.

6. The apparatus of claim 1,
wherein the plurality of images comprise a representation of one or more chips corresponding to each player in the plurality of players;
wherein an input in the one or more inputs comprises a bet command corresponding to an input-providing player in the one or more players;
wherein the one or more new images comprise a modified representation of one or more chips corresponding to the input-providing player, the modified representation removing one or more chips from a representation of one or more chips corresponding to the input-providing player;
wherein the one or more new images further comprise a representation of the removed one or more chips; and
wherein at least one of the one or more computing devices is configured to transmit the representation of the removed one or more chips to a central region of the single display.

7. A method executed by one or more computing devices for executing a multi-player card game on a single display, the method comprising:
generating, at least one of the one or more computing devices, one or more playing cards corresponding to each player in a plurality of players, wherein the one or more playing cards are generated based at least in part on a random function, a set of playing cards remaining in a virtual deck of playing cards, and a set of rules corresponding to a card game;
transmitting, by at least one of the one or more computing devices, a plurality of images to a plurality of regions of a single display, wherein each region in the plurality of regions corresponds to a player in the plurality of players, wherein each region in the plurality of regions is located at a position on the single display which is closer to a physical location reserved for the corresponding player than to any other physical location reserved for any other player, and wherein the plurality of images comprise a representation of the one or more playing cards corresponding to each player;
receiving, by at least one of the one or more computing devices, one or more inputs from one or more players in the plurality of players;
transmitting, by at least one of the one or more computing devices, one or more new images to the single display in response to the one or more inputs;
wherein the representation of the one or more playing cards corresponding to each player comprises one or more face-down playing cards corresponding to each player, wherein an input in the one or more inputs comprises a request to view the one or more face-down playing cards corresponding to an input-providing player in the one or more players, and wherein transmitting one or more new images in the single display in response to the one or more inputs comprises:
transmitting one or more face-up playing cards corresponding to the one or more face-down playing cards to a sub-region of a region corresponding to the input-providing player; and
transmitting one or more colored bars in the sub-region, the one or more colored bars bordering the one or more face-up cards.

8. The method of claim 7, wherein each region in the plurality of regions is located at a position on the single display which is adjacent to the physical location reserved for the corresponding player.

9. The method of claim 7, wherein the one or more inputs are received via a touch gesture on the single display.

10. The method of claim 7, further comprising:
concealing the one or more face-up playing cards from all players other than the input-providing player via a concealing element disposed on and fixed relative to the single display above the sub-region and configured to limit a viewing angle of the sub-region.

11. The method of claim 10, wherein the concealing element comprises a lens, the lens comprising one or more angled planes configured to limit the viewing angle of the sub-region to a viewing area corresponding to a physical location reserved for the input-providing player.

12. The method of claim 7, wherein plurality of images comprise a representation of one or more chips corresponding to each player in the plurality of players, wherein an input in the one or more inputs comprises a bet command corresponding to an input-providing player in the one or more players, and wherein transmitting one or more new images in the single display in response to the input comprises:

modifying a representation of one or more chips corresponding to the input-providing player to remove one or more chips; and transmitting a representation of the removed one or more chips to a central region of the single display.

13. At least one non-transitory computer-readable medium storing computer-readable instructions that, when executed by one or more computing devices, cause at least one of the one or more computing devices to:

generate one or more playing cards corresponding to each player in a plurality of players, wherein the one or more playing cards are generated based at least in part on a random function, a set of playing cards remaining in a virtual deck of playing cards, and a set of rules corresponding to a card game;

transmit a plurality of images to a plurality of regions of a single display, wherein each region in the plurality of regions corresponds to a player in the plurality of players, wherein each region in the plurality of regions is located at a position on the single display which is closer to a physical location reserved for the corresponding player than to any other physical location reserved for any other player, and wherein the plurality of images comprise a representation of the one or more playing cards corresponding to each player;

receive one or more inputs from one or more players in the plurality of players; and transmit one or more new images to the single display in response to the one or more inputs;

wherein the representation of the one or more playing cards corresponding to each player comprises one or more face-down playing cards corresponding to each player, wherein an input in the one or more inputs comprises a request to view the one or more face-down playing cards corresponding to an input-providing player in the one or more players, and wherein the instructions that, when executed by at least one of the one or more computing devices, cause at least one of the one or more computing devices to transmit one or more new images in the single display in response to the one or more inputs further cause at least one of the one or more computing devices to:

transmit one or more face-up playing cards corresponding to the one or more face-down playing cards to a sub-region of a region corresponding to the input-providing player; and transmit one or more colored bars in the sub-region, the one or more colored bars bordering the one or more face-up cards.

14. The at least one non-transitory computer-readable medium of claim 13, wherein each region in the plurality of regions is located at a position on the single display which is adjacent to the physical location reserved for the corresponding player.

15. The at least one non-transitory computer-readable medium of claim 13, wherein the one or more inputs are received via a touch gesture on the single display.

16. The at least one non-transitory computer-readable medium of claim 13, wherein plurality of images comprise a representation of one or more chips corresponding to each player in the plurality of players, wherein an input in the one or more inputs comprises a bet command corresponding to an input-providing player in the one or more players, and wherein the instructions that, when executed by at least one of the one or more computing devices, cause at least one of the one or more computing devices to transmit one or more new images in the single display in response to the one or more inputs further cause at least one of the one or more computing devices to:

modify a representation of one or more chips corresponding to the input-providing player to remove one or more chips; and transmit a representation of the removed one or more chips to a central region of the single display.

\* \* \* \* \*